(12) United States Patent
Yoshimura

(10) Patent No.: US 11,084,233 B2
(45) Date of Patent: Aug. 10, 2021

(54) TIRE REPAIR METHOD

(71) Applicant: BRIDGESTONE CORPORATION, Tokyo (JP)

(72) Inventor: Koichi Yoshimura, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 277 days.

(21) Appl. No.: 16/098,904

(22) PCT Filed: Jun. 2, 2017

(86) PCT No.: PCT/JP2017/020681
§ 371 (c)(1),
(2) Date: Nov. 5, 2018

(87) PCT Pub. No.: WO2017/213054
PCT Pub. Date: Dec. 14, 2017

(65) Prior Publication Data
US 2019/0193347 A1    Jun. 27, 2019

(30) Foreign Application Priority Data

Jun. 9, 2016 (JP) .............................. JP2016-114986
Jun. 9, 2016 (JP) .............................. JP2016-114987
Jun. 9, 2016 (JP) .............................. JP2016-114988

(51) Int. Cl.
*B29C 73/10* (2006.01)
*B29C 73/30* (2006.01)
(Continued)

(52) U.S. Cl.
CPC .............. *B29C 73/04* (2013.01); *B29C 73/02* (2013.01); *B29C 73/10* (2013.01); *B29C 73/305* (2013.01);
(Continued)

(58) Field of Classification Search
CPC .......... B29C 73/06; B29C 73/10; B60C 25/16
See application file for complete search history.

(56) References Cited

U.S. PATENT DOCUMENTS 1,317,124 A    9/1919   Booth
3,327,351 A    6/1967   Alm
(Continued)

FOREIGN PATENT DOCUMENTS

CA    1028810 A      4/1978
FR    2148372    *  3/1973
(Continued)

OTHER PUBLICATIONS

Machine translation of FR 2148372, 1973.*
Aug. 15, 2017 International Search Report issued in International Patent Application No. PCT/JP2017/020681.

*Primary Examiner* — Justin R Fischer
(74) *Attorney, Agent, or Firm* — Oliff PLC

(57) ABSTRACT

Repair materials made of at least unvulcanized rubber are applied on a repair site of a damaged part of a tire, heating pads are applied on surfaces of the repair materials, wood pieces or other stuffing members differing in size are stuffed inside the tire, in a tire circumferential in tire circumferential direction where the repair materials are applied. The tire circumferential is fastened and pressed from surroundings by bands, and the repair site is heated by the heating pads to vulcanize the unvulcanized rubber of the repair materials, to thereby repair the tire. This repair method provides a low-cost tire repair method capable of maintaining the shape of the tire at the time of pressing and vulcanization, in various kinds of tires.

11 Claims, 21 Drawing Sheets

(51) Int. Cl.
  *B29C 73/04* (2006.01)
  *B29C 73/02* (2006.01)
  *B29C 73/34* (2006.01)
  *B29C 73/26* (2006.01)
  *B29L 30/00* (2006.01)

(52) U.S. Cl.
  CPC ........ *B29C 73/34* (2013.01); *B29C 2073/264* (2013.01); *B29L 2030/00* (2013.01)

(56) References Cited

U.S. PATENT DOCUMENTS

| | | |
|---|---|---|
| 4,303,380 A | 12/1981 | Frankforter |
| 4,978,403 A | 12/1990 | Kinyon |
| 5,296,173 A | 3/1994 | Dornan |
| 2013/0306212 A1 | 11/2013 | Shouyama |

FOREIGN PATENT DOCUMENTS

| | | |
|---|---|---|
| JP | S50-82183 A | 7/1975 |
| JP | 2010-42593 A | 2/2010 |
| JP | 2012-161998 A | 8/2012 |
| WO | 2012/111347 A1 | 8/2012 |

\* cited by examiner

TIRE REPAIR METHOD

TECHNICAL FIELD

The present invention relates to a tire repair method for repairing a damaged part of a damaged tire.

BACKGROUND ART

A tire may be damaged by an obstacle during traveling, and, if the damage is severe, repair thereof is required.

In the case of a damage to the tread, a repair method is used in which an outer circumferential surface of the tread is shaved off to obtain a flat-surfaced base tire, and a vulcanized tread section provided with a pattern is adhered to the outer circumferential surface, followed by vulcanization, to manufacture a so-called retreaded tire.

Particularly, in the case of an extra-large tire for construction vehicles, manufacture of a retreaded tire requires more labor than in the cases of a passenger car tire or a truck or bus tire, and, due to traveling on a rough road to a mine or the like, not only the tread but other parts than the tread may be damaged.

In view of this, particularly in the case of an off-the-road radial tire (ORR tire) for large-type construction vehicles and the like, a method of repairing only the damaged part of the tire is required. In response to the requirement, there has been proposed a method in which a repair patch made of unvulcanized rubber is applied on the damaged part of the tire, a heating pad is placed thereon, and heating and vulcanization are conducted by the heating pad in a pressed state, to repair the damage (see PATENT DOCUMENT 1).

On the other hand, there has also been proposed a repair method in which the damaged part is filled with unvulcanized rubber, after which the part is sandwiched between a pressing pad and a back-up plate of a pressing apparatus, and is pressed and heated, to vulcanize the unvulcanized rubber (see PATENT DOCUMENT 2).

PRIOR ART DOCUMENT

Patent Document

[Patent Document 1]
JP S50-82183 A
[Patent Document 2]
U.S. Pat. No. 4,303,380

The tire repair method disclosed in Patent Document 1 is a method in which repair patches made of unvulcanized rubber in a state of an instable shape before crosslinking are applied on a damaged part of a tire, heating pads are applied on inner and outer surfaces of the tire in such a manner as to cover the repair patches, the inner heating pad is pressed against a tire inner surface by an air bag expanding in the tire, the outer heating pad is pressed against a tire outside surface by an air bag expanding in the outside of the tire. As a result, under the pressing from both inside and outside of the tire, the repair patches are vulcanized under heating by the heating pads, to repair the damaged part.

In the tire repair method described in PATENT DOCUMENT 1, the inside air bag for pressing the heating pad applied on the inner surface of the tire is required to press the heating pad and to support the tire from inside, while enduring the pressing from outside the tire, thereby maintaining the shape of the tire.

For this purpose, it is necessary to prepare a plurality of kinds of air bags suited to tire inner surface shapes and capable of maintaining the shape of the tire at the time of pressing and vulcanization, which leads to a rise in cost and needs labor for managing many air bags.

In the tire repair method described in PATENT DOCUMENT 1, in the repair step for a damaged part, the heating pad operates to vulcanize the unvulcanized rubber of the repair patch by heating the repair patch and joins the rubber of the repair patch to the vulcanized rubber in the surroundings of the repair patch. Therefore, heating pads must be applied not only on the surface of the repair patch but also on the surface of the tire in the surroundings of the repair patch, for heating both the part to be repaired by the repair patch and the surroundings thereof. The repair patch is unvulcanized rubber, while the tire in the surroundings of the repair patch is vulcanized rubber. For this reason, if the repair patch and the surroundings thereof are evenly heated by the heating pads, over-vulcanization of the already vulcanized rubber in the surroundings of the repair patch may be brought about.

In the repair method described in PATENT DOCUMENT 2, the pressing pad is made of a flexible material such as silicone, and is made to be deformed along the shape of a repair part of the damaged part, when the pressing pad is put into contact with the repair part to be pressed thereon. On the other hand, the back-up plate is made of metal. For repair tire parts having different curved surfaces such as a shoulder section and a side wall section, it is necessary to prepare pressing pads and back-up plates suited to the curved surfaces of the respective repair tire parts.

On the other hand, particularly in the case where a tread section of a tire is damaged, at the time of repairing the shapes of lands and grooves of the tread section and pressing and vulcanizing the repair part, a method for maintaining the shapes is needed. Though not disclosed in PATENT DOCUMENT 1 and PATENT DOCUMENT 2, for maintaining the shapes of the lands and grooves of the tread at the time of pressing and vulcanization, for example, it is necessary to separately prepare mold members suited to the patterns of the treads, which needs cost for manufacturing mold members suited to the tread patterns on the basis of the corresponding tires, and labor for repair with management of many mold members. Therefore, these approaches are low in working efficiency.

SUMMARY OF THE INVENTION

[Underlying Problems to be Solved by the Invention]

The present invention has been made in consideration of the foregoing. It is therefore a primary object of the present invention to provide a tire repair method which makes it possible to maintain the shape of a tire at the time of pressing and vulcanization, coping with various kinds of tires.

It is another object of the present invention to provide a tire repair method which does not need air bags or tools suited to the shapes of tire, unnecessitates mold members suited to patterns of the tread, and makes it possible to realize a reduction in cost and an enhanced working efficiency.

It is a further object of the present invention to provide a tire repair method which makes it possible to shorten the vulcanization time of unvulcanized rubber of a repair material and to restrain over-vulcanization of rubber being vulcanized in the surroundings of the repair material.

Means to Solve the Underlying Problems

In order to achieve the above objects, according to the present invention, there is provided a tire repair method comprising: depositing a repair material made of at least unvulcanized rubber in a damaged part of a damaged tire; applying a heating pad on a surface of the repair material deposited in the damaged part of the tire; stuffing a plurality of stuffing members different in size in the tire in a circumferentially restricted part of the tire in which the repair material is deposited; fastening the circumferentially restricted part of the tire from outside thereof to apply a pressure thereto; and heating a repair site including the damaged part by heating the heating pad to vulcanize the unvulcanized rubber of the repair material.

According to the tire repair method as above, a plurality of different stuffing members are stuffed in the tire inside of the tire circumferential part which is a restricted or local part in the tire circumferential direction and in which the repair material is deposited. Therefore, independently of the kind of the tire, the stuffing members can be appropriately stuffed in the tire inside in conformity with the inner surface shape of the tire. Accordingly, the tire shapes of various kinds of tires can be easily maintained at the time of pressing and vulcanizing, and the tire can be repaired appropriately. In addition, since the stuffing members stuffed in the tire inside can be reused, a reduction in cost can be realized.

According to one embodiment of the present invention, the repair material is deposited from a tire inside in a part facing the tire inside of the damaged part, and the heating pad is applied on an inside of the repair material; and the stuffing members include pad-adjoining stuffing members stuffed in a periphery of the heating pad, the pad-adjoining stuffing members being smaller than other stuffing members in sectional area taken in a tire widthwise direction.

According to the above, the pad-adjoining stuffing members stuffed in the periphery of the heating pad provided in the tire inside are smaller than the other stuffing members in sectional area of the tire widthwise section (a section as cut along a plane containing a tire rotational center axis). Therefore, a multiplicity of the pad-adjoining stuffing member small in sectional area can be finely applied on an irregularly shaped surface in the surroundings of the heating pad covering the repair material on an inner peripheral surface of the tire, and pressure is evenly applied to the heating pad. Accordingly, appropriate repair can be performed without deforming the repair material.

In addition, the other stuffing members than the pad-adjoining stuffing member can be enlarged in sectional area, the number of the stuffing members to be stuffed inside the tire can be reduced, and the stuffing operation is facilitated.

According to a preferred embodiment of the present invention, the stuffing members includes central stuffing members cooperating with and pressing the repair material, and peripheral stuffing members cooperating with and pressing a tire part located along a peripheral edge of the repair material; and the peripheral stuffing members have a thermal conductivity greater than that of the central stuffing members.

According to the above, the peripheral stuffing members positioned on and pressing the tire part along the peripheral edge of the repair material is greater in thermal conductivity than the central stuffing members pressing the repair material. Therefore, the repair material in the damaged part of the tire is pressed by the central stuffing members low in thermal conductivity, so that heat radiation through the central stuffing members is restrained, and vulcanization of the unvulcanized rubber is accelerated. On the other hand, the tire part in the periphery of the repair material is pressed by the peripheral stuffing members high in thermal conductivity, so that heat radiation is accelerated, and vulcanization there is restrained. Therefore, it is possible to vulcanize the unvulcanized rubber of the repair material in a short time, to join the repair material to the vulcanized rubber in the surroundings thereof, and to restrain over-vulcanization of the rubber being vulcanized in the surroundings of the repair material.

Preferably, the stuffing members are rod-like in shape, and the stuffing members are stuffed inside the tire in such a posture that longitudinal directions of the rod-like stuffing members are perpendicular to a section of the tire along a tire widthwise direction.

According to this feature, the rod-shaped stuffing members are stuffed inside the circumferentially restricted part of the tire in such a posture that the directions perpendicular to the tire widthwise section are the longitudinal directions of the stuffing members. Therefore, each of the stuffing members can press the repair material disposed in the damaged part, over the whole width in the directions perpendicular to the tire widthwise section. Consequently, the number or amount of the stuffing members to be stuffed in the tire inside can be reduced, and the stuffing operation is facilitated.

According to a preferred embodiment of the present invention, a band is wound around a circumferential part of the tire stuffed with the stuffing members, to apply a pressing force to and fasten the tire.

According to the above feature, the band is wound around, and fastens the circumferentially restricted part of the tire stuffed with the stuffing members. Therefore, the circumferentially restricted part stuffed with the stuffing members for supporting the repair material deposited in the damaged part and for maintaining the shape of the tire can be efficiently fastened by the band, so that the repair material and the surroundings thereof can be easily fastened or clamped.

In an embodiment of the present invention, the damaged part of the tire is a tread section; a molding material in a fluid state is prepared by mixing at least water and a water-insoluble material with calcined gypsum; the molding material in the fluid state is filled in a groove of the repaired tread section formed by the repair material deposited in the damaged part including its surroundings; the heating pad is applied and pressed on a surface of the tread section in the damaged part, after the molding material is cured and dried; and the damaged part is heated by the heating pad to vulcanize the unvulcanized rubber.

As above-mentioned, the shape of the tire in which the tread section is damaged is repaired with the repair material made of at least unvulcanized rubber, at least water and the water-insoluble member are mixed with calcined gypsum to obtain the molding material in a fluid state, the grooves in the tread section in the surroundings of the repaired part repaired with the repair material are filled with the molding material in the fluid state, and, after the molding material is cured and dried, the repaired part is pressed and is vulcanized by heating with the heating pad. Therefore, at the time of vulcanization, air bags and tools are not required in conformity with the shapes of tires. Further, the tread section of the unvulcanized rubber in the repaired part can be maintained in a desired shape, without preparing molds on the basis of the shapes of treads. Therefore, it is possible to realize an enhanced working efficiency and a reduction in cost.

Furthermore, since the molding material for filling the grooves is a mixture of calcined gypsum with at least water and the water-insoluble member, the proportion of a gypsum slurry composed of calcined gypsum and water and the like other than the water-insoluble member can be lowered by the water-insoluble member. Accordingly, the time for curing and drying the molding material can be shortened, so that it is possible to shorten the time required for repair of the tire, to enhance operability, and to realize a reduction in cost.

In an embodiment of the invention, the damaged part is a tire widthwise end portion of the tread section; a tire widthwise side surface of the damaged part is covered with the molding material, while groove or grooves in the surroundings of the damaged part are filled with the molding material; and the damaged part is pressed and heated to vulcanize the unvulcanized rubber, after the molding material is cured and dried.

According to the above feature, even in the case where a tire widthwise end portion of the tread section of a tire is damaged and needs repair, it is possible, after repairing the shape of a shoulder section of the tire widthwise end portion with the repair material, to fill the grooves in the surroundings of the repair part with the molding material, to cover the repair part side surface, that is, the tire widthwise side surface of the repair part with the molding material, and to vulcanize and heat the repair part after the curing and drying of the molding material. Therefore, even when the tire widthwise end portion of the tread section is damaged, repair by vulcanizing and pressing can be performed while maintaining the shape of the repair part in the tire widthwise end portion of the tread section, without preparing molds based on the kinds of tires and the shapes of treads. Thus, workability can be further enhanced, and a further reduction in cost can be realized.

As the water-insoluble member, there may be used at least one of rubber, wood, and metal.

In case rubber or wood is used as the water-insoluble material, waste rubber discarded in repair operations or inexpensive wood can be used, whereby a reduction in cost can be realized. Further, by use of a metal as the water-insoluble material for the molding material to be used for the repair part and the surroundings thereof, thermal conductivity from the heating pad to the repair part and the surroundings thereof through the molding material is enhanced, and the part in which vulcanization should be accelerated can be effectively vulcanized.

In a preferred embodiment of the invention, after the heating pad is applied on the surface of the tread section in the damaged part, the stuffing members are stuffed inside the tire in the circumferentially restricted part thereof; the circumferentially restricted part is fastened and pressed from outside; and the damaged part is heated by the heating pad to vulcanize the unvulcanized rubber.

The above feature ensures that the repair part can be pressed from the tire inside by the stuffing members, and, therefore, the need for air bags or tools shaped in conformity with the inside of the tire is eliminated. Further, working efficiency can be enhanced, and a reduction in cost can be realized.

In a preferred embodiment of the present invention, a central heat transfer intermediary member is applied on a surface of the repair material applied on the damaged part of the tire; peripheral heat transfer intermediary members lower in thermal conductivity than the central heat transfer intermediary member are applied on a tire surface of a peripheral edge of the repair material; the heating pad is applied on surfaces of the central heat transfer intermediary member and the peripheral heat transfer intermediary members, to press the heating pad on the damaged part to be repaired with the repair material and surroundings thereof; and the damaged part is heated by the heating pad to vulcanize the unvulcanized rubber of the repair material.

As above stated, the repair material made of at least unvulcanized rubber is deposited in the damaged part of the damaged tire, the central heat transfer intermediary member is applied on the surface of the repair material deposited in the damaged part of the tire, while the peripheral heat transfer intermediary members lower in thermal conductivity than the central heat transfer intermediary member are placed on the tire surface in the periphery of the repair material, the heating pad is applied on the surfaces of the central heat transfer intermediary member and the peripheral heat transfer intermediary members, the surroundings of the repair site to be repaired with the repair material are pressed, and the repair site is heated by the heating pad to vulcanize the unvulcanized rubber of the repair material. Since the peripheral heat transfer intermediary members applied on the tire surface in the periphery of the repair material is lower in thermal conductivity than the central heat transfer intermediary member applied on the surface of the repair material, heat is efficiently transferred by the central heat transfer intermediary member higher in thermal conductivity, vulcanization of the repair material is thereby accelerated, and the repair material is joined to the vulcanized rubber in the surroundings thereof. On the other hand, in the tire part in the surroundings of the repair part, heat transfer is restrained by the peripheral heat transfer intermediary members lower in thermal conductivity, and vulcanization is restrained.

Therefore, vulcanization time for the unvulcanized rubber of the repair material can be shortened, and over-vulcanization of the rubber being vulcanized in the surroundings of the repair material can be restrained.

Preferably, the peripheral heat transfer intermediary members are larger in thickness than the central heat transfer intermediary member.

Because the peripheral heat transfer intermediary members are greater in thickness than the central heat transfer intermediary member, the peripheral heat transfer intermediary members lower in thermal conductivity are arranged in a thicker state in the tire part in the surroundings of the repair material, so that heat transfer is further restrained, vulcanization is further restrained, and over-vulcanization of the rubber being vulcanized in the surroundings of the repair material is securely prevented.

According to a preferred embodiment of the present invention, the repair material made of at least unvulcanized rubber is deposited in the damaged part of the tire; a heat transfer intermediary member is applied on a tire surface of a peripheral edge of the repair material deposited in the damaged part of the tire; the heating pad is applied on a surface of the repair material and a surface of the heat transfer intermediary member; surroundings of the damaged part to be repaired with the repair material are pressed; and the repair site is heated by the heating pad to vulcanize the unvulcanized rubber of the repair material.

In this embodiment, the heat transfer intermediary member is applied on the tire surface in the surroundings of the repair material deposited in the damaged part of the tire, the heating pad is placed on the surface of the repair material and on the surface of the heat transfer intermediary member, the surroundings of the repair site to be repaired with the repair material are pressed, and the repair site is heated by the heating pad to vulcanize the unvulcanized rubber of the repair material. Therefore, since the heat transfer intermediary member is not applied on the repair material deposited in the damaged part of the tire, vulcanization of the repair material is accelerated through direct heat transfer, and the repair material is joined to the vulcanized rubber in the surroundings of the repair material. On the other hand, due to the interposition of the heat transfer intermediary member, heat transfer in the tire part in the surroundings of the repair material is restrained, and vulcanization there is restrained.

Therefore, the unvulcanized rubber of the repair material can be vulcanized in a short time, and over-vulcanization of the rubber being vulcanized in the surroundings of the repair material can be restrained.

Advantageous Effects of Invention

According to the present invention, a plurality of different stuffing members are stuffed inside the tire and in the tire circumferential part which is a local area in the tire circumferential direction and in which the repair material is deposited. Therefore, for any one of various kinds of tires, the stuffing members can be appropriately stuffed in the tire inside in conformity with the shape of the inner surface of the tire, and, accordingly, the shape of the tire can be easily maintained at the time of pressing or fastening and vulcanization, and the tire can be repaired appropriately.

Since the stuffing members to be stuffed in the tire inside can be reused, a reduction in cost can be realized.

MODE FOR CARRYING OUT THE INVENTION

Embodiments of the present invention will be described below with reference to the drawings. A first embodiment of the present invention will first be described based on FIGS. 1 to 9.

The present embodiment is applied to a construction vehicle tire (off-the-road radial tire) 1 for a large-type construction vehicle.

Figure 1:
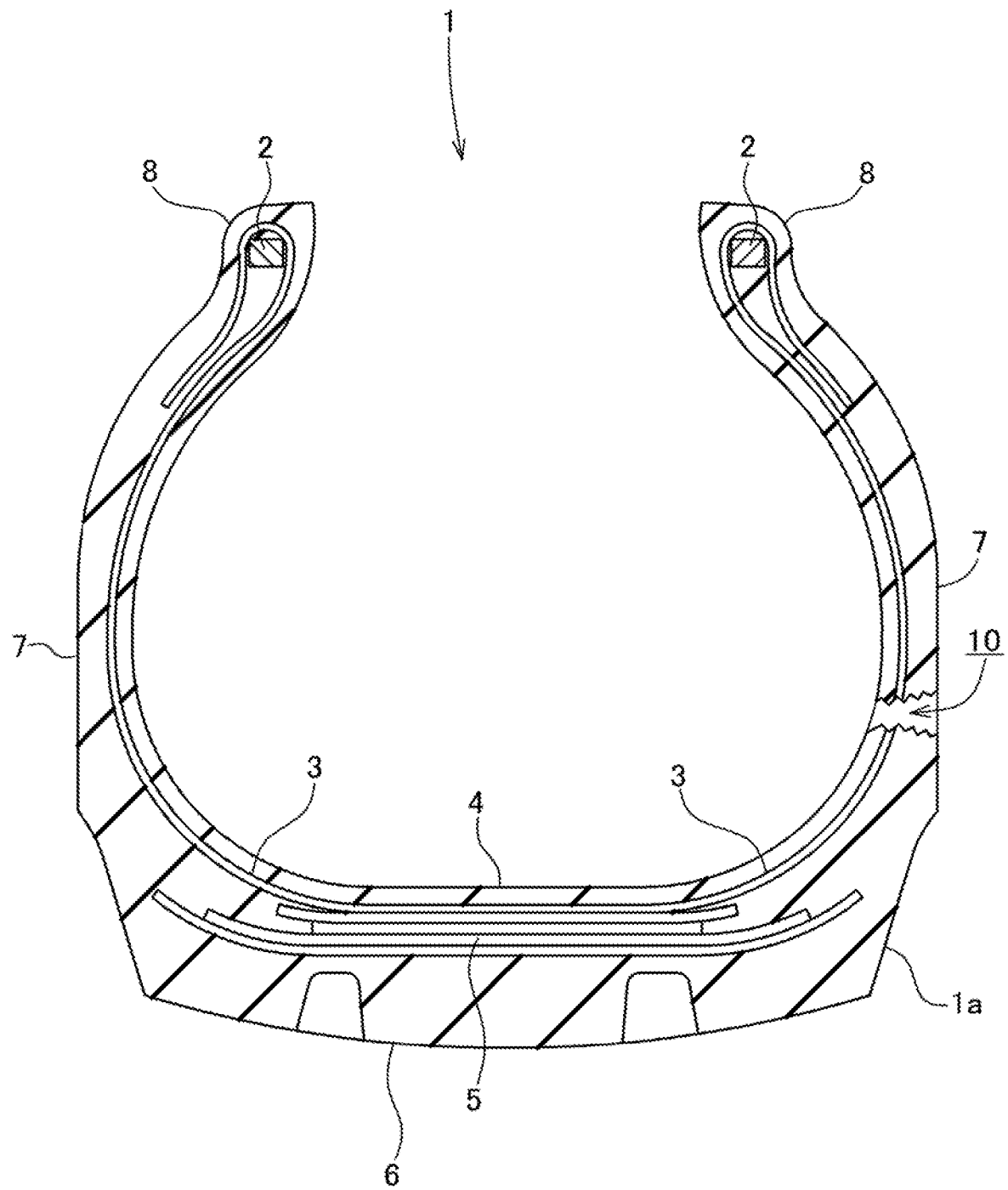
FIG. 1 is a tire widthwise sectional view of a construction vehicle tire damaged in a side wall section, the tire being according to a first embodiment of a tire repair method of the present invention.

FIG. 1 is a sectional view along a tire width direction (a sectional view as cut along a plane containing a tire rotational center axis) of the construction vehicle tire 1 damaged in a side wall section.

The construction vehicle tire 1 has a pair of left and right bead rings 2 each formed by winding a metallic wire in a ring form, and a carcass ply 3 is formed in a toroidal form by winding both side edges thereof around the bead rings 2 such that a part between both side edges is bulged to a radially outer side of the tire.

On an inner surface of the carcass ply 3, an inner liner section 4 resistant to air permeation is formed.

On a periphery of a crown part of the carcass ply 3, a plurality of belts are wound in a laminated manner to form belt layers 5, and a tread section 6 is formed thereon to cover the belt layers 5.

On outer surfaces of both side parts of the carcass ply 3, side wall sections 7 are formed.

Bead sections 8 are provided so as to cover annular end portions of the carcass ply 3 wound around the bead rings 2 and bent back, and the bead sections 8 are each continuous with the inner liner section 4 on the inner side and continuous with the side wall section 7 on the outer side.

The carcass ply 3 is a cord rubber coating layer in which a plurality of ply cords are coated with a ply rubber.

As the ply cord, there may be used, for example, a nylon cord, a Tetoron (trademark) cord, or a steel cord formed by intertwisting a plurality of thin steel wires.

As the material of the ply rubber, there may be used, for example, natural rubber, synthetic rubber, carbon black, and the like.

As the material of the inner liner section 4, there may be used a butyl rubber high in airtightness, and the like.

The belts in the belt layers 5 are belts formed by coating belt cords with a belt rubber and forming the resulting material into a belt form.

As illustrated in FIG. 1, the construction vehicle tire 1 is damaged in the side wall section 7.

A damaged part 10 penetrates a side wall of the tire in such a manner that a part of the side wall section 7 is cut out, the carcass ply 3 in the inside is cut, and a part of the inner liner section 4 is lost.

A repair step for the construction vehicle tire 1 damaged in this way will be described with reference to the drawings.

Figure 2:
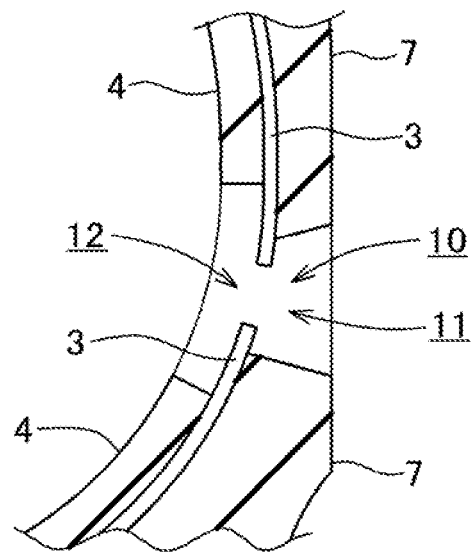
FIG. 2 is a sectional view of a major part for explaining a first step of repair of a damaged part of the construction vehicle tire.

First, as shown in FIG. 2, rubber in the surroundings of a lost portion of the damaged part 10 in the side wall section 7 is removed in a manner of cutting out from the tire outside until the carcass ply 3 is exposed, to form an outside repair recess 11 in a desired shape, and rubber in the surroundings of the lost portion of the damaged part 10 in the inner liner section 4 is removed from the tire inside until the carcass ply 3 is exposed, to form an inside repair recess 12 in a desired shape.

It is desirable that a surface exposed upon removal of the rubber of the carcass ply 3 is finished by buff polishing such as to provide appropriate ruggedness for adhesion of a repair material.

Figure 3:
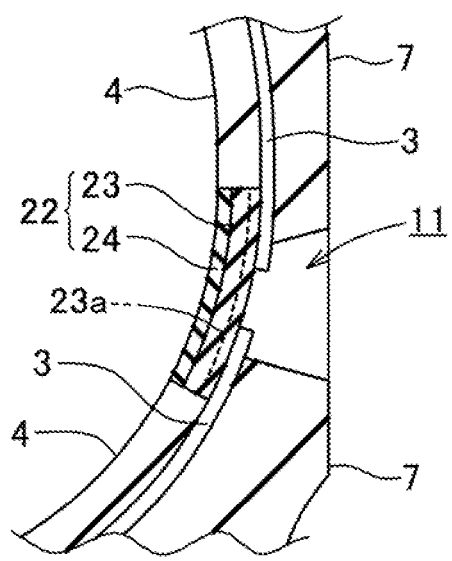
FIG. 3 is a sectional view of the major part for explaining a next step.
Figure 4:
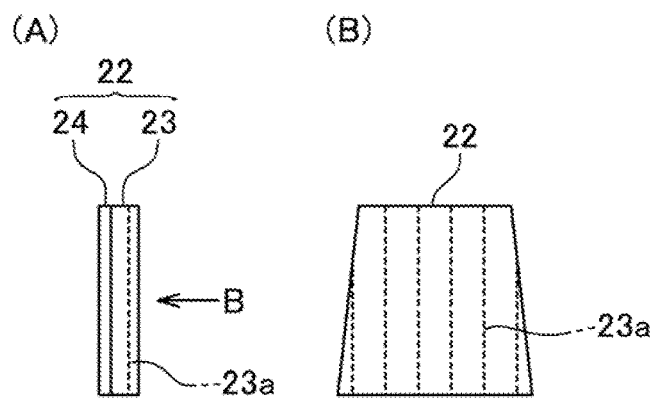
FIG. 4(A) is a side view of an inner patch member.
FIG. 4(B) is a front view of the same.

Next, referring to FIG. 3, an inside patch member 22 as a repair material is attached or adhered to the inside repair recess 12 in the inner liner section 4, specifically to a recess inner surface and the exposed carcass ply 3 from the tire inside.

Note that in some cases, the inside patch member 22 may be adhered using an adhesive or the like.

As illustrated in FIGS. 4(A) and 4(B), the inside patch member 22 has a configuration in which a reinforcement sheet 23, as a cord rubber coating sheet formed by coating a plurality of reinforcement cords 23a arranged in parallel to each other with rubber, and a sheet-shaped inner liner repair rubber member 24 are preliminarily integrated by adhering the latter to the former. The inside patch member 22 is in an unvulcanized state and is trapezoidal in shape.

In a preceding step, the inside repair recess 12 may be cut out into a desired shape according to the shape of the inside patch member 22.

As the rubber material for coating the reinforcement cords 23a in the reinforcement sheet 23 of the inside patch member 22, there may be used natural rubber, synthetic rubber, carbon black, and the like; particularly, the material is preferably the same as the rubber used for the carcass ply 3, but may be a different rubber material.

Further, the reinforcement cords 23a need only be cords for reinforcing the isolated carcass ply 3, and may be intertwisted cords, a single filament, or an aligned bundle of a plurality of filaments.

The reinforcement cord 23a is preferably thinner than the ply cord of the carcass ply 3.

If the reinforcement cord 23a is of the same material and the same diameter as the ply cord of the carcass ply 3, the reinforcement cord 23a would bear a tension excessively, and an end portion thereof would be easily separated.

As the inner liner repair rubber member 24 of the inside patch member 22, there is preferably used a butyl rubber material high in airtightness, like the inner liner section 4.

In this way, the inside repair recess 12 where the inner liner section 4 is lost is completely filled with the inside patch member 22, and an inside surface thereof is securely provided with air permeation resistance by the inner liner repair rubber member 24.

As illustrated in FIG. 3, the reinforcement sheet 23 of the inside patch member 22 adhered to the inside repair recess 12 of the inner liner section 4 of the side wall section 7 covers a lost part of the carcass ply 3 and the surroundings thereof.

The reinforcement cord 23a of the reinforcement sheet 23 of the inside patch member 22 is substantially parallel to the ply cord of the carcass ply 3, and is disposed so as to supplement the lost part of the ply cord of the carcass ply 3.

Figure 5:
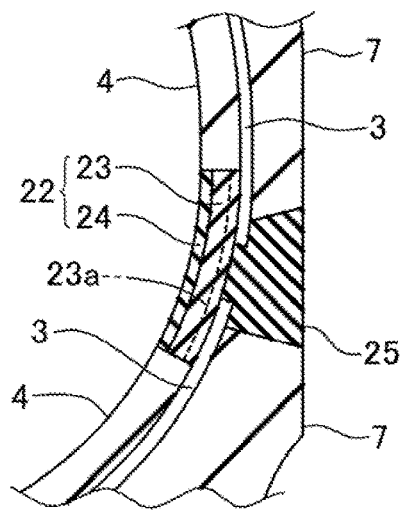
FIG. 5 is a sectional view of the major part for explaining a further step.

Next, referring to FIG. 5, the outside repair recess 11 is filled with a side repair rubber, which is a repair material, from the tire outside, to form a side repair rubber section 25.

The side repair rubber is an unvulcanized rubber, and fills up a vacant recess of the outside repair recess 11, to form the side repair rubber section 25.

The side repair rubber section 25 is preferably of the same material as the side wall section 7, but a different material may also be used.

In this way, the inside patch member 22 and the side repair rubber section 25, which are unvulcanized repair materials, are applied in a state of being embedded in the damaged part 10 in the side wall section 7 of the construction vehicle tire 1 (see FIG. 5).

Figure 6:
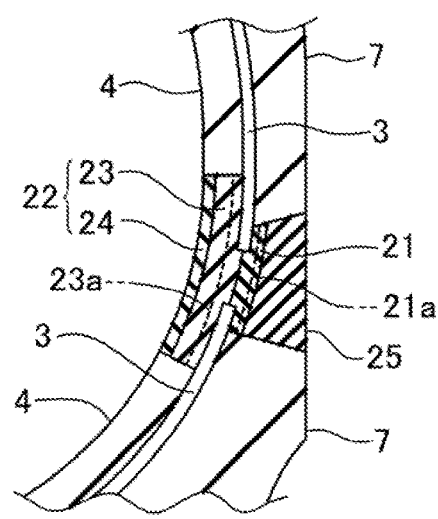
FIG. 6 is a major part sectional view of a modification.

The inside patch member 22 is applied from the inside of the construction vehicle tire 1 and the side repair rubber section 25 is filled from the outside, but, depending on the degree of damage, a step may be adopted in which as depicted in FIG. 6, the inside patch member 22 is applied from the inside of the construction vehicle tire 1, and then an outside patch member 21, which is a reinforcement sheet obtained by coating reinforcement cords 21a with rubber, is fitted from the outside, before filling with the side repair rubber section 25.

Figure 7:
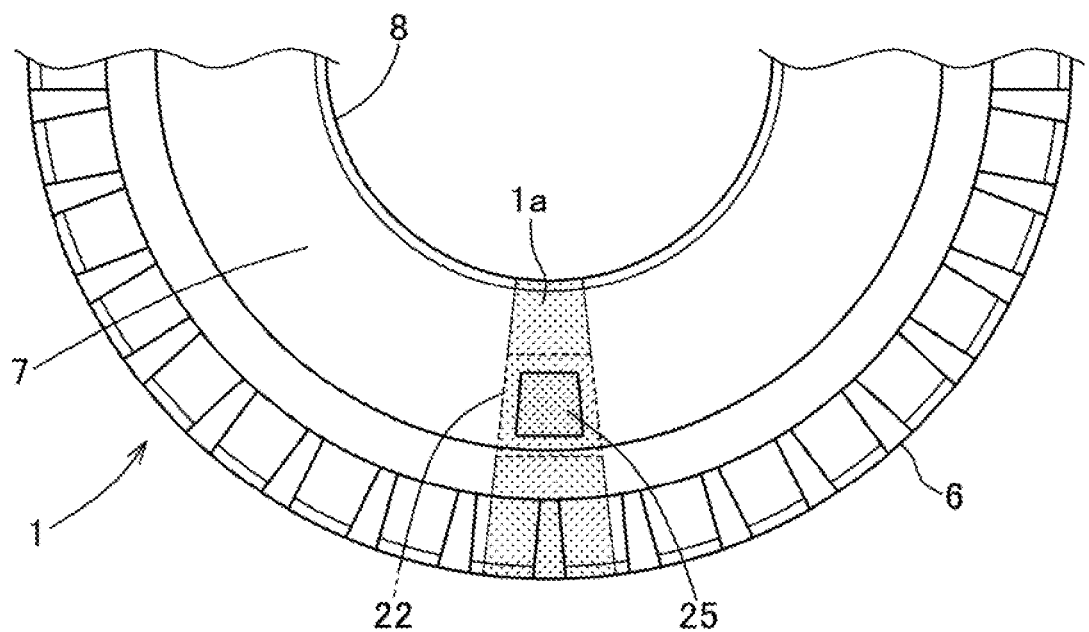
FIG. 7 is a partial side view of the construction vehicle tire in which a repair material is deposited.

As depicted in FIG. 7, the side repair rubber section 25 placed to fill the damaged part 10 in the side wall section 7 is exposed, in side view of the construction vehicle tire 1.

A tire circumferential part 1a, which is a restricted or local area in the tire circumferential direction and in which the repair materials of the side repair rubber section 25 and the inside patch member 22 are placed, is indicated by a dotted pattern in FIG. 7.

Figure 9:
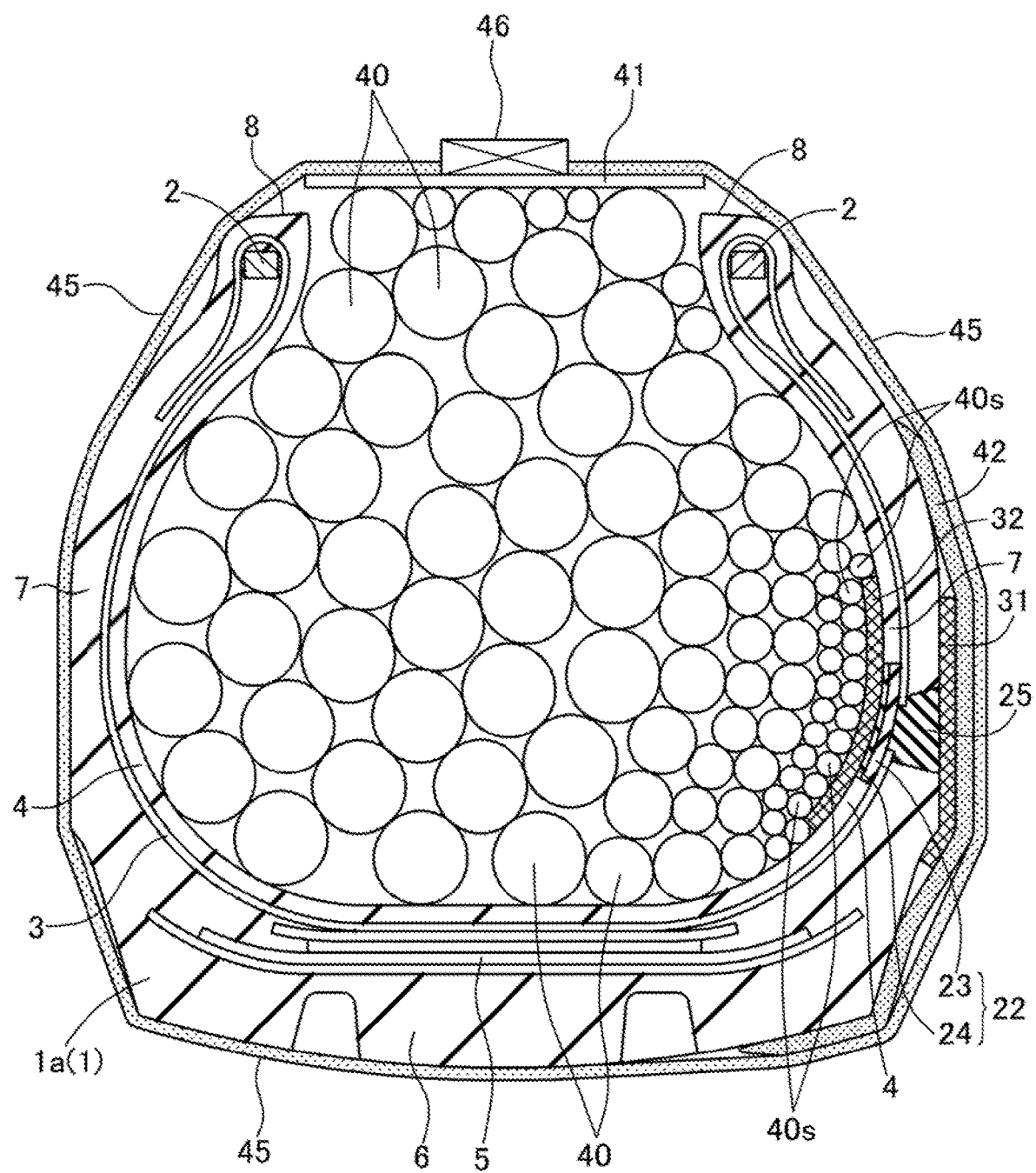
FIG. 9 is a sectional view of the construction vehicle tire in the vulcanizing step.

Next, referring to FIG. 9, an outside electric heating pad 31 is applied on a surface portion of the side repair rubber section 25 placed to fill the outside repair recess 11 in the damaged part 10 in the tire circumferential part 1a of the construction vehicle tire 1 and on a tire outer surface in the surroundings of the side repair rubber section 25 (a surface of the side wall section 7). An inside electric heating pad 32 is applied on the surface of the inside patch member 22 adhered to the inside repair recess 12 in the damaged part 10 and on a tire inner surface in the surroundings of the inside patch member 22 (a surface of the inner liner section 4).

Figure 8:
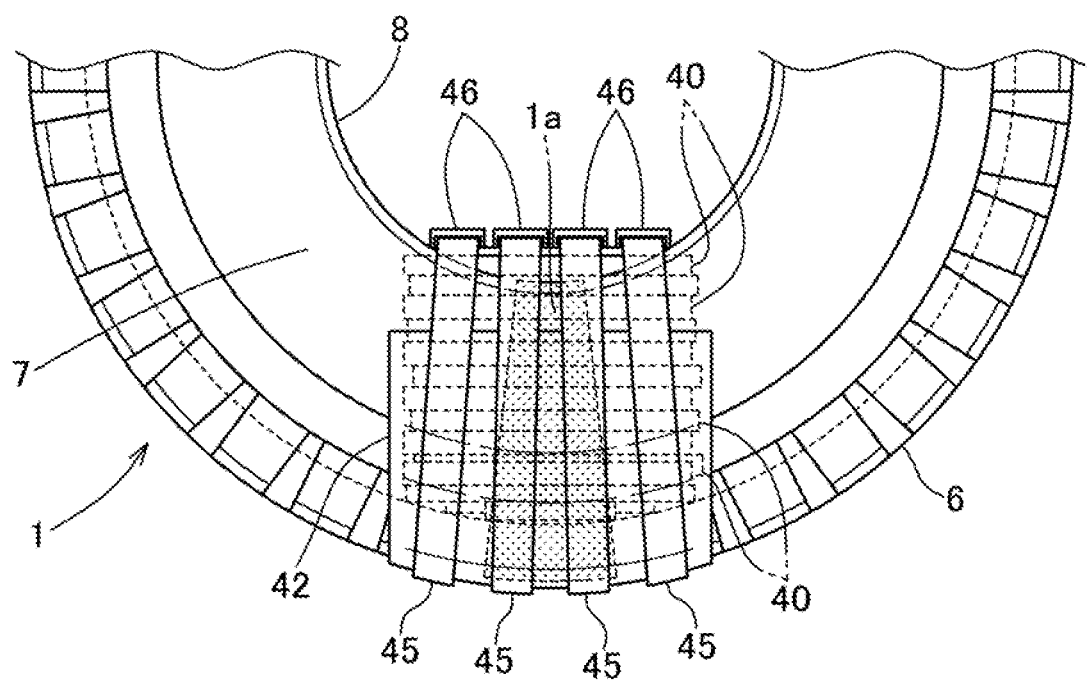
FIG. 8 is a partial side view of the construction vehicle tire in a vulcanizing step.

Then, referring to FIGS. 8 and 9, wood pieces 40 as stuffing members are stuffed in the tire inside of the tire circumferentially local part 1a and the surrounding part where the repair materials (the inside patch member 22, the side repair rubber section 25) for the construction vehicle tire 1 are provided. The wood pieces 40 are stuffed inside of the inside electric heating pad 32.

As the wood pieces 40, substantially cylindrical rod-shaped ones are used.

A multiplicity of the wood pieces 40 differing in outside diameter are stuffed in the tire inside of the tire circumferentially local part 1a and the surrounding part of the construction vehicle tire 1.

The rod-shaped wood pieces 40 are stuffed inside of the inside electric heating pad 32 and in the construction vehicle tire 1 in such a posture that the longitudinal direction of each of the wood pieces 40 is a direction perpendicular to a section of the tire in the tire width direction (a section as cut along a plane containing the tire rotational center axis).

FIG. 9 shows a sectional view of the construction vehicle tire 1 in the tire width direction, in which a cross sections of the wood pieces 40 stuffed in the tire inside are depicted.

As illustrated in FIG. 9, of the stuffed wood pieces 40, pad-adjoining wood pieces 40s in the surroundings of the inside electric heating pad 32 are smaller than the other wood pieces 40, in sectional area in the section in the tire width direction.

Therefore, a multiplicity of the pad-adjoining wood pieces 40s small in sectional area can be finely disposed on the irregularly shaped surface in the surroundings of the inside electric heating pad 32 covering the inside patch member 22 which is the repair material on the inner peripheral surface of the tire.

As depicted in FIG. 9, the wood pieces 40 are stuffed in the tire inside of the tire circumferentially local part 1a of the construction vehicle tire 1 in a manner of bulging from an opening between the bead sections 8 opposed to each other, and a plate-shaped presser member 41 is placed on the bulging wood pieces 40. In addition, the outside electric heating pad 31 disposed on the side repair rubber section 25 filling the outside repair recess 11 in the damaged part 10, is covered by a cover sheet 42, together with the surroundings thereof.

Next, as depicted in FIGS. 8 and 9, bands 45 are wound around the tire circumferentially local part 1a and the surrounding part, where the wood pieces 40 are stuffed, of the construction vehicle tire 1, from the outside of the presser member 41 and the cover sheet 42, and the bands 45 are tightened.

For example, four bands 45 are wound, and, through a buckle 46 attached to one end of each of the bands 45, the other end of the band 45 is passed, and the band 45 is tightened and fixed (see FIG. 8).

By the tightening of the four bands 45, those of the wood pieces 40 stuffed in the tire inside of the construction vehicle tire 1 which are located between the bead sections 8 are pressed by the presser member 41, and pressing forces are sequentially transmitted to the wood pieces 40 in the tire, resulting in that a pressure for expansion from the inside is exerted on the inner liner section 4 on the tire inner peripheral surface.

From the outside of the construction vehicle tire 1, pressing forces due to the tightening of the four bands 45 are applied to the tread section 6 and the side wall section 7 that form the tire outer peripheral surface.

Therefore, the side repair rubber section 25 placed to fill the outside repair recess 11 in the damaged part 10 is pressed through the outside electric heating pad 31, while the inside patch member 22 adhered to the inside repair recess 12 in the damaged part 10 is pressed by the wood pieces 40 through the inside electric heating pad 32.

Note that while the repair part is clamped or fastened by the four belt-shaped bands 45 in the present embodiment, the number of the bands and the width of the bands may be appropriately changed according to the size and/or position of the repair part. In some cases, fastening by a single strap having a large width for sufficiently covering the repair part may be adopted.

Next, electric current is passed in the outside electric heating pad 31 and the inside electric heating pad 32 to generate heat, whereby the side repair rubber section 25 and the inside patch member 22 as the repair materials made of unvulcanized rubber are vulcanized by heating, and the repair materials of the side repair rubber section 25 and the inside patch member 22 are joined to the vulcanized rubber in the surroundings thereof.

In this way, repair of the damaged part 10 of the construction vehicle tire 1 is completed.

The first embodiment of the tire repair method according to the present invention as described in detail above produces the following effects.

As illustrated in FIG. 9, of the wood pieces 40 as the stuffing members, the pad-adjoining wood pieces 40s stuffed in the surroundings of the inside electric heating pad 32 are smaller than the other wood pieces 40 in sectional area in section cut along a plane containing the tire rotational center axis. Therefore, a multiplicity of the pad-adjoining wood pieces 40s having a small sectional area can be finely arranged on the irregularly shaped surface in the surroundings of the inside electric heating pad 32 that covers the inside patch member 22 in the inner peripheral surface of the tire, pressure can be evenly applied to the inside electric heating pad 32, and appropriate repair can be performed without deforming the inside patch member 22.

In addition, since the wood pieces 40 other than the pad-adjoining wood pieces 40s are enlarged in sectional area, the number of the wood pieces 40 to be stuffed in the tire can be reduced, which facilitates the stuffing operation.

Further, since the wood pieces 40 stuffed inside the tire can be reused, a reduction in cost can be realized.

As illustrated in FIGS. 8 and 9, the rod-shaped wood pieces 40 are stuffed in the tire inside with their longitudinal directions oriented in directions perpendicular to the section in the tire width direction. Therefore, the inside patch member 22 where the wood pieces 40 are arranged in the damaged part 10 can be pressed over the whole length of width in the direction perpendicular to the section in the tire width direction. Accordingly, the number or amount of the wood pieces 40 to be stuffed in the tire inside can be reduced, and the stuffing operation is facilitated.

As shown in FIGS. 8 and 9, the bands 45 are wound and tightened around the tire circumferentially local part 1a and the surrounding part where the wood pieces 40 are stuffed. Therefore, the circumferentially local part 1a of the construction vehicle tire 1, stuffed with the wood pieces 40 for supporting from inside the inside patch member 22 and the side repair rubber section 25, as repair materials in the damaged part 10, and for maintaining the shape of the tire, can be efficiently clamped or fastened by the bands 45 from outside, and the repair materials and the surroundings thereof can be pressed easily.

While the wood pieces are used as the stuffing members to be stuffed in the tire inside in the first embodiment, the stuffing members are not limited to the wood pieces. Any members may be used which can press the repair materials embedded in the damaged part, while maintaining the shape of the tire, and which is insusceptible to thermal deformation.

Note that the sectional shape of the stuffing members such as the wood pieces may not be substantially circular; for example, an ellipse, a semicircle, polygons such as triangles and tetragons, and shapes obtained by combining a polygon or polygons with a circular arc or arcs may also be used.

A tire repair method according to a second embodiment will be described below, with reference to FIG. 10.

In the first embodiment described above, the wood pieces 40 as the stuffing members are stuffed on the inside of the inside electric heating pad 32 inside the construction vehicle tire 1. In the second embodiment, stuffing members differing in thermal conductivity are used depending on the place of stuffing, and, in the other points, the second embodiment is the same as the first embodiment.

Therefore, the other members than the stuffing members are the same members as above and are denoted by the same reference signs used above.

The stuffing members in the second embodiment are of two types, namely, substantially cylindrical rod-shaped wood pieces 50 and iron-made cylindrical rods 51 higher than the wood pieces 50 in thermal conductivity.

Figure 10:
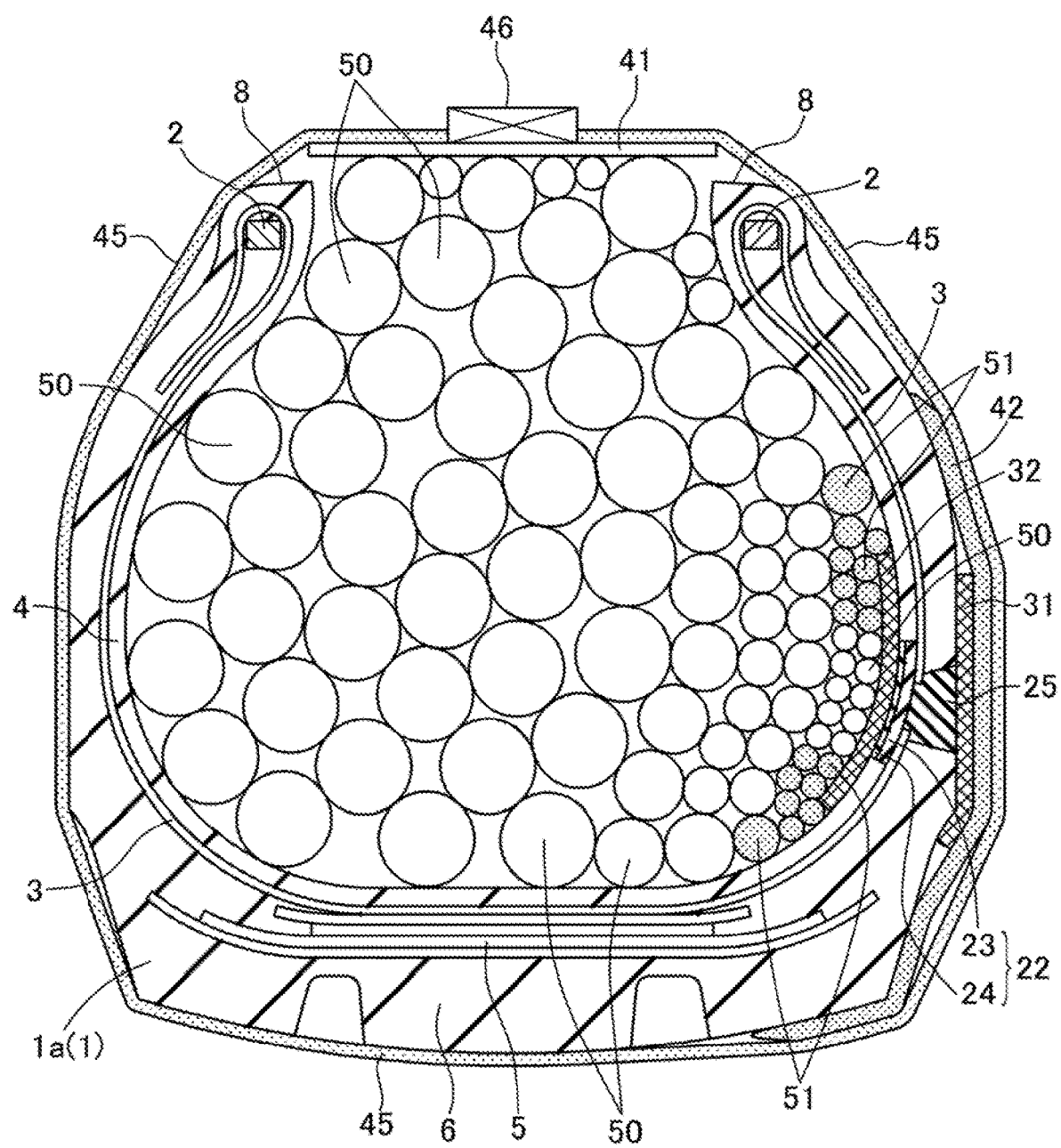
FIG. 10 is a tire widthwise sectional view of the construction vehicle tire in a vulcanizing step in a second embodiment of the present invention.

Referring to FIG. 10, the wood pieces 50 (void circular sections in FIG. 10) are used as central stuffing members that co-act with the inside patch member 22 (which is the repair material) through the inside electric heating pad 32 and that press the inside patch member 22, while the iron rods 51 (circular sections with dotted pattern in FIG. 10) are used as outer peripheral stuffing members that co-act with tire parts in the outer periphery of the inside patch member 22 through the inside electric heating pad 32 and that press the tire parts in the outer periphery of the inside patch member 22.

The repair step is the same as that in the first embodiment, except for the following points. In the step of stuffing the stuffing members inside of the inside electric heating pad 32 in the construction vehicle tire 1, as depicted in FIG. 10, the wood pieces 50 small in sectional area are distributed in that part of the tire inside which corresponds to the inside patch member 22 through the inside electric heating pad 32, while the iron rods 51 having a small sectional area comparable to that of the wood pieces 50 small in sectional area are distributed in those parts which correspond to the tire parts in the vicinities of the outer edges of the inside patch member 22 through the inside electric heating pad 32, and the wood pieces 50 large in sectional area are stuffed in the other inside spaces of the tire.

Note that the stuffing members are each stuffed in such a posture that the direction perpendicular to the section in the tire width direction coincides with the longitudinal direction thereof. Therefore, in the ranges across the outer edges of the inside patch member 22, the short iron rods 51 are disposed on both sides of the short wood pieces 50.

When the tire circumferential part 1a is fastened by the bands 45, the inside patch member 22 and the side repair rubber section 25 as the repair materials embedded in the repair recesses in the damaged part 10 are pressed through the inside electric heating pad 32 and the outside electric heating pad 31.

Then, by passing electric current in the outside electric heating pad 31 and the inside electric heating pad 32 to generate heat therein, the side repair rubber section 25 and the inside patch member 22 as the repair materials made of unvulcanized rubber are vulcanized by heating, and the repair materials are joined to the vulcanized rubber in the surroundings thereof.

In this heating vulcanizing step, the repair materials (the inside patch member 22, the side repair rubber section 25) disposed in the damaged part 10 of the tire are pressed by the wood pieces 50 having a low thermal conductivity through the inside electric heating pad 32, whereby heat radiation is restrained, and vulcanization of the unvulcanized rubber of the repair materials (the inside patch member 22, the side repair rubber section 25) is accelerated. On the other hand, the tire parts along the outer edges of the repair materials are pressed by the iron rods 51 having a high thermal conductivity through the inside electric heating pad 32, whereby heat radiation is accelerated, and vulcanization is restrained.

For this reason, it is possible to vulcanize the unvulcanized rubber of the repair materials (the inside patch member 22, the side repair rubber section 25) in a short time, to join the repair materials and the vulcanized rubber in the surroundings thereof to each other, and to restrain overvulcanization of the rubber being vulcanized, in the surroundings of the repair materials.

The stuffing members to be stuffed inside the tire are not limited to the wood pieces and iron rods. Any members may be used that can press the repair materials embedded in the damaged part while maintaining the shape of the tire, and that is insusceptible to thermal deformation. Two kinds of such stuffing members that are different in thermal conductivity may be used.

The first and second embodiments of the invention described above relate to a repair method in the case where the construction vehicle tire 1 is damaged in the side wall section 7. A repair method in a third embodiment is used in a case where the tire 1 is damaged in a tread section and will be described with reference to FIGS. 11 to 23. Note that in the third embodiment, the members which are the same or equivalent to the members used in the first embodiment above are denoted by the same reference signs as used above.

Figure 11:
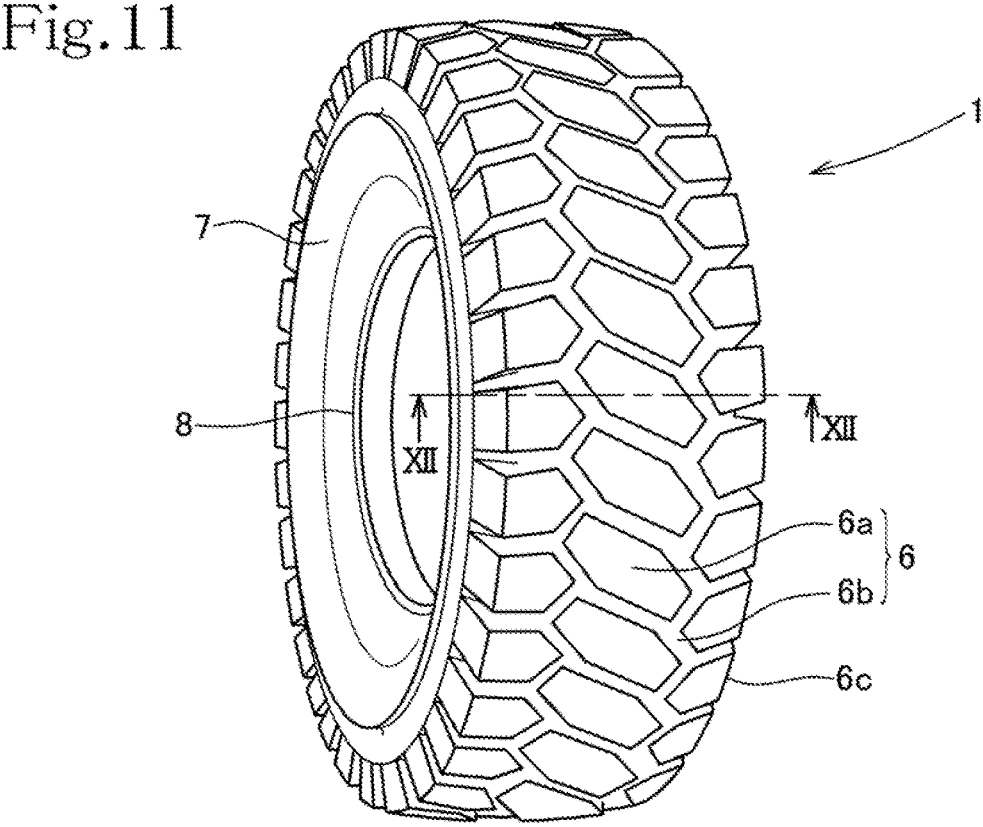
FIG. 11 is a perspective view of a typical tire repaired by the tire repair method of the present invention.
Figure 12:
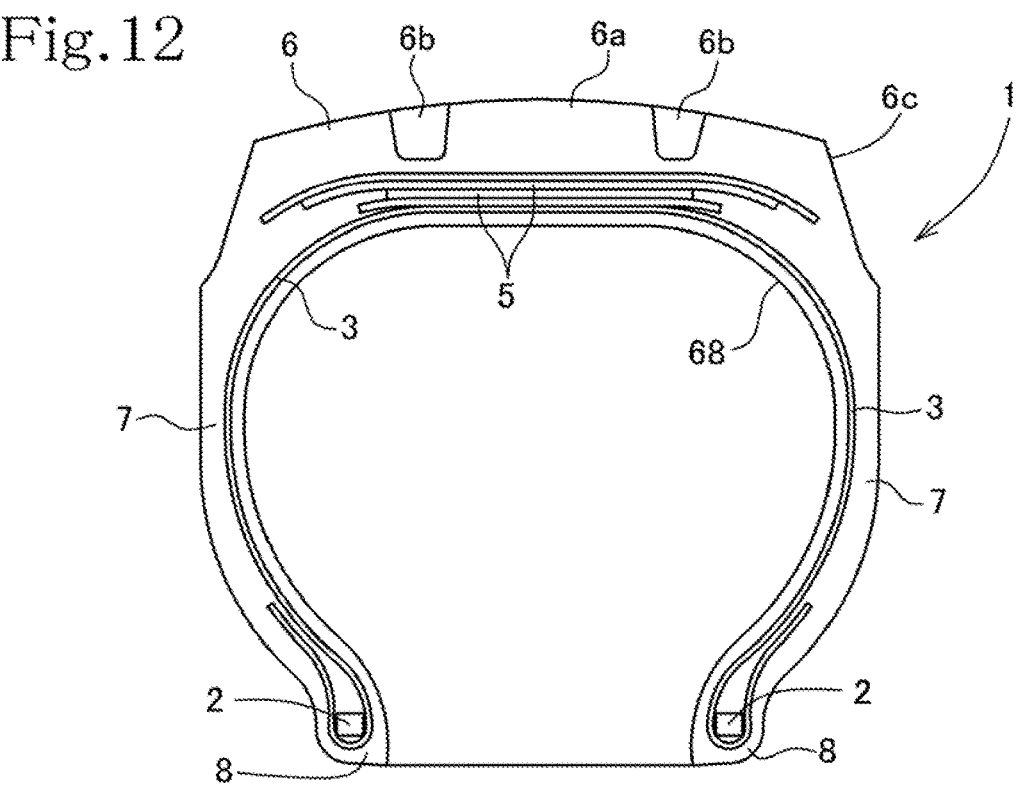
FIG. 12 is a sectional view in the tire widthwise direction of the tire of FIG. 11.

FIG. 11 shows a typical tire to which a tire repair method according to the third embodiment is to be used, and which is, for example, an extra-large radial tire such as a construction vehicle tire. A sectional view, in the tire width direction, of this tire 1 is depicted in FIG. 12.

Like the tire shown in FIG. 1, the tire 1 includes: bead sections 8 in which a pair of left and right annular bead rings 2 are embedded; a carcass ply 3 arranged in a toroidal form between the pair of bead sections 8; belt layers 5 in circumferential contact with a radially outside portion of the carcass ply 3; a tread section 6 in circumferential contact with an outer peripheral surface of the belt layers 5; and side wall sections 7 covering side portions of the tire 1.

The tread section 6 is formed with grooves 6b for increasing friction with the ground surface and thereby increasing a tractive force. Regions, which are surrounded by the grooves 6b or surrounded by the groove 6b and a side edge 6c of the tread section 6 and which constitute a tire outer surface, are lands 6a.

Figure 13:
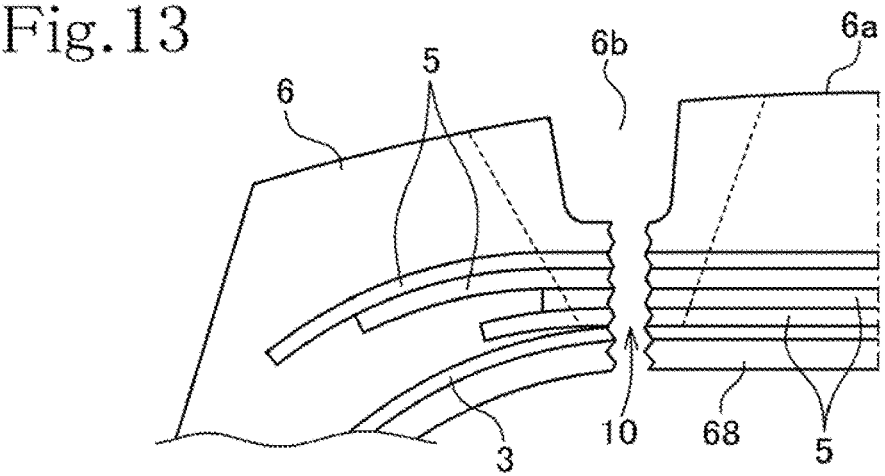
FIG. 13 is an illustration of a repair step in a third embodiment of the present invention, depicting a damaged state of the tire.

In the tire repair method according to the third embodiment, a tire 1 is repaired, in which a damaged part 10 of the tread section 6 as depicted in FIG. 13 is damaged in the form of a cut, and in which the cut reaches the carcass ply 3 and the belt layers 5 in the tire 1 in a manner to cut both the carcass ply 3 and the belt layers 5.

Figure 14:
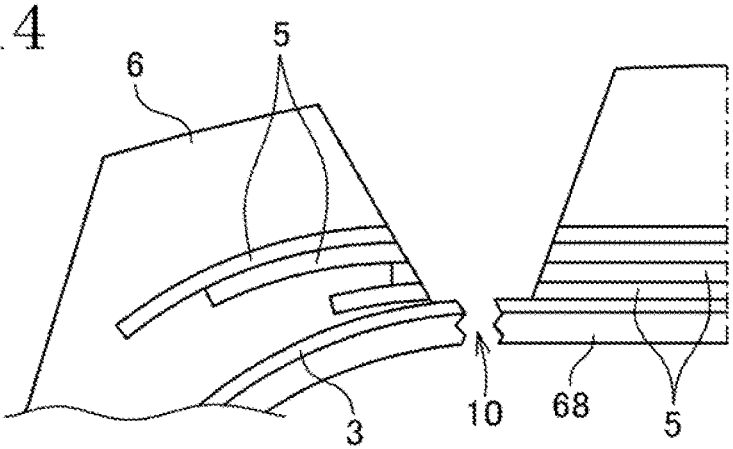
FIG. 14 is an illustration of the repair step in the third embodiment, depicting a state in which a damaged part on a tread side on an outer side of a carcass ply is removed.
Figure 15:
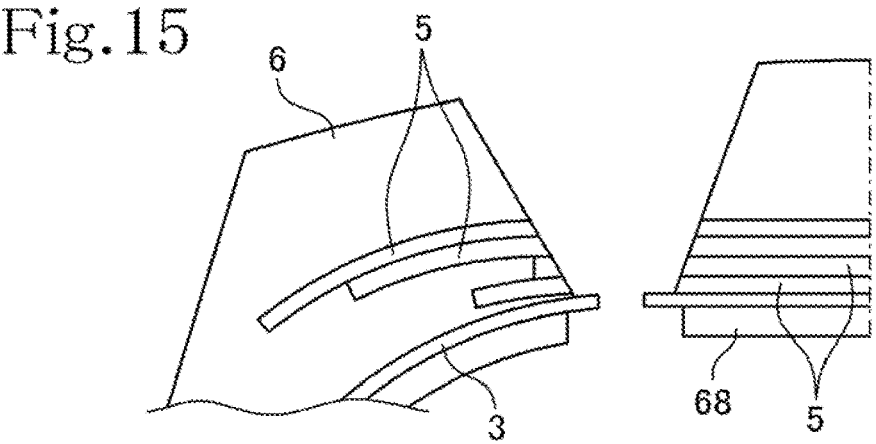
FIG. 15 is an illustration of the repair step in the third embodiment, depicting a state in which a damaged part on an inner side of the carcass ply is removed.

The damaged part 10 of the tread section 6 is examined, and tread rubber and inner liner rubber in the surroundings of the damaged part 10 are removed, by use of a re-groover (not depicted) or the like, as depicted in FIGS. 14 and 15. In this instance, in order that the damaged part 10 of the tread section 6 and an inner liner section 68 is not left, the tread rubber and the inner liner rubber are removed in a size somewhat larger radially than a predetermined range, with the damaged part 10 as a center of the removed size, while taking care to leave only the carcass ply 3, and the surface is finished.

Figure 16:
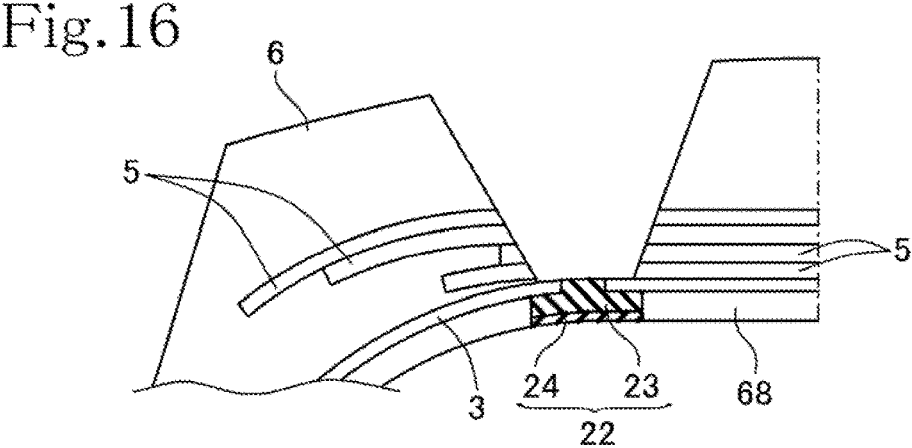
FIG. 16 is an illustration of the repair step in the third embodiment, depicting a state in which an unvulcanized patch member is adhered to a ply from inside.

As illustrated in FIG. 16, a patch member 22 as a repair material is adhered to the radially inner side of the exposed carcass ply 3, in such a manner as to cover the whole of the damaged part 10 of the carcass ply 3. In adhering the patch member 22 to the carcass ply 3, an adhesive or the like may be used. While the patch member 22 is adhered from the radially inner side of the tire 1 in the present embodiment, patch members may be adhered both to the inner side and the outer side, depending on the degree of damage.

Figure 20:
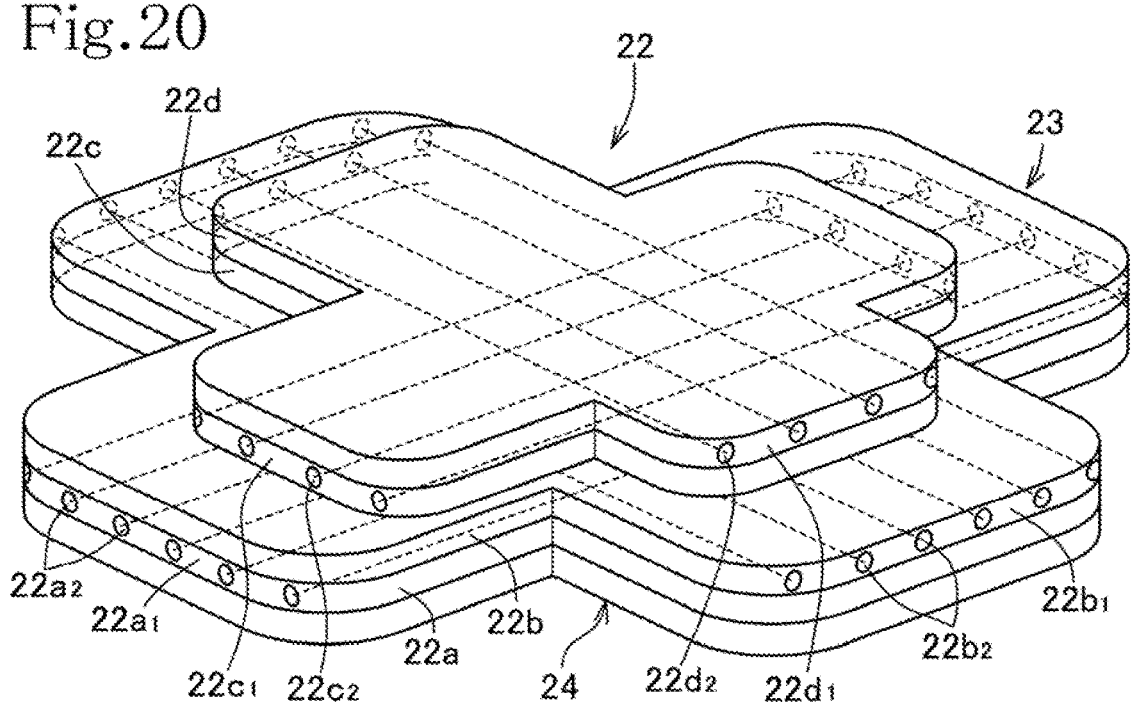
FIG. 20 is a perspective view depicting a patch member used in the repair method in the third embodiment.

As depicted in FIG. 20, the patch member 22 used in the tire repair method in the present embodiment includes: a reinforcement laminate 23 which is a cross-shaped laminate of unvulcanized rubber and in which reinforcement cords are embedded; and an inner liner repair rubber section 24 integrally adhered to the reinforcement laminate 23.

The reinforcement laminate 23 includes two layers of lower laminates 22a and 22b, and two layers of cross-shaped upper laminates 22c and 22d which are laid on the lower laminate 22b and are smaller in size than the lower laminates 22a and 22b. These laminates 22a, 22b, 22c, and 22d have reinforcement cords $22a_2$, $22b_2$, $22c_2$, and $22d_2$ (which are disposed in parallel) covered with unvulcanized rubber sections $22a_1$, $22b_1$, $22c_1$, and $22d_1$. The reinforcement cords $22a_2$, $22b_2$, $22c_2$, and $22d_2$ are disposed in the laminates in such a manner as to be at right angles in plan view. While the two layers of the upper laminates and the two layers of the lower laminates are laminated in the present embodiment, the number of the laminates may be an even number or an odd number, and the upper laminates and the lower laminates may be different from each other in the number of layers laminated.

The inner liner repair rubber section 24 adhered to a lower surface of the reinforcement laminate 23 is a sheet-shaped member made of an unvulcanized inner liner rubber, is formed in the same cross shape as that of the lowermost surface of the reinforcement laminate 23, and is integrated with the reinforcement laminate 23, to form the patch member 22.

While the patch member 22 used in the present embodiment is a laminate, the patch member may not be a laminate but may be composed of a single layer. In addition, while the upper laminate and the lower laminate are different in size, all the laminates may be of the same in size. The shape of the laminates may not be a cross but may be a square or a rectangle.

Figure 17:
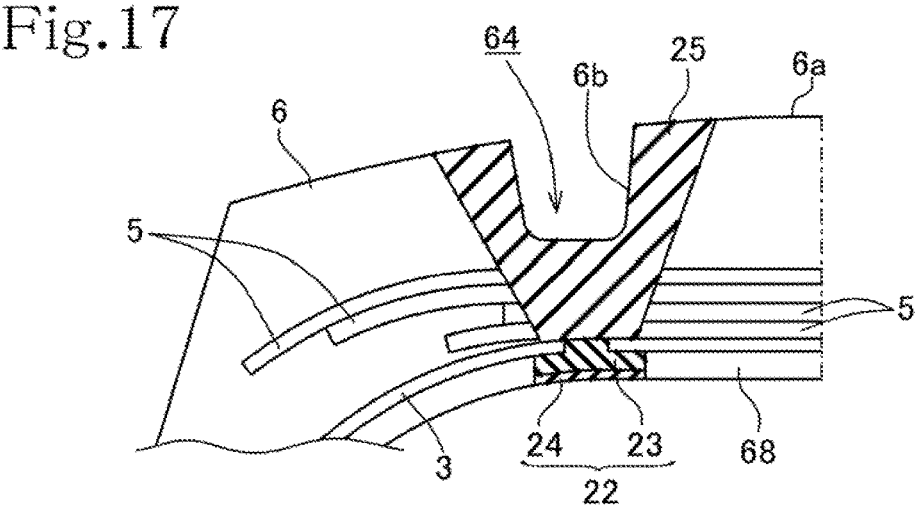
FIG. 17 is an illustration of the repair step in the third embodiment, depicting a state in which filling supply of an unvulcanized tread rubber is conducted to repair the shape.

As illustrated in FIG. 17, an unvulcanized repair tread rubber 25 as a repair material in a heated and fluidized state is supplied onto the outside of the carcass ply 3 exposed by removal of the tread rubber (see FIG. 16), to fill the lost part while crushing or kneading it with a spatula or the like, and the shapes of the lands 6a and the grooves 6b of the tread section 6 that have been lost are reproduced to be the same as the shapes before the trouble of the tire 1, that is, the shapes of the tire 1 in a substantially unused state. The new tread rubber 25 to be used for repair may be the same as or different from the tread rubber before the repair. In this way, the shape of the damaged part of the tire damaged in the tread section is repaired by the unvulcanized rubber patch member 22 and the unvulcanized repair tread rubber 25 as the repair materials.

At the time of vulcanizing, by pressurizing and heating, a repair part 64 repaired by the unvulcanized rubber as above described, a molding material 61 for maintaining the shape of the repair part 64 is prepared. The operation of preparing the molding material 61 may be conducted after the repair operation is finished, or may be performed simultaneously with the repair operation.

The molding material 61 is obtained by mixing a water-insoluble member such as wood, waste rubber or metal into a gypsum slurry prepared by kneading powdery calcined gypsum as a base material with water. The calcined gypsum is also called calcium sulfate ½ hydroxide, and is cured by becoming gypsum dihydrate (calcium sulfate dihydrate) upon reaction with water.

In producing the gypsum slurry, the proportion of water added to the calcined gypsum is not particularly limited, and may be selected according to the fluidity demanded. Further, various additives such as an adhesion improver may be added, as required.

As the water-insoluble member, there may be used wood, waste rubber, metal and the like, which may be powdery, granular or larger in size than granule, and may further be one that varies in shape. Since the water-insoluble member is mixed with the gypsum slurry, the proportion of the gypsum slurry required in the molding material 61 can be lowered, and, therefore, the time for curing and drying of the molding material 61 can be shortened.

While the time for curing and drying of the molding material 61 can be more shortened as the proportion of the water-insoluble member in the gypsum slurry is higher, the proportion may be changed appropriately, taking into account the desired time for curing and the strength of the molding material 61 after curing which is required in vulcanizing the unvulcanized rubber. In addition, in case where the water-insoluble member is small particles such as powdery or granular member, the water-insoluble member may be mixed with the powdery calcined gypsum and the resulting mixture may be kneaded with water to obtain the molding material 61.

Figure 18:
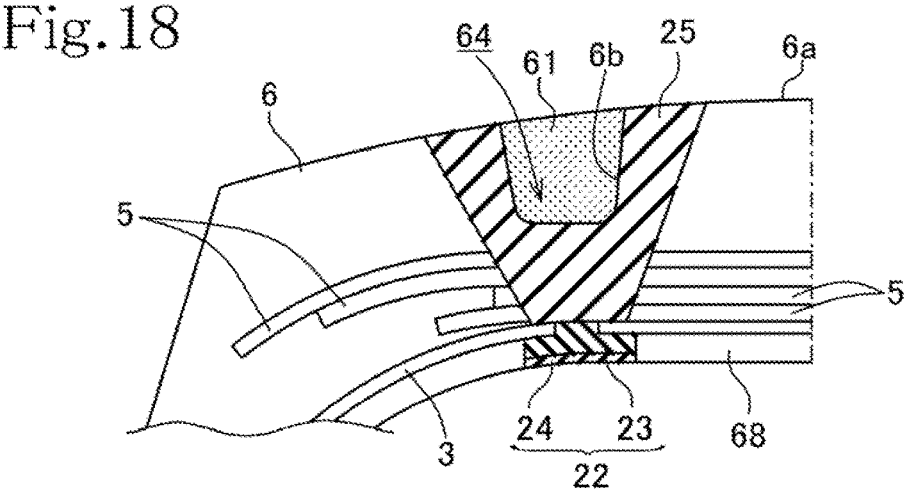
FIG. 18 is an illustration of the repair step in the third embodiment, depicting a state in which a molding material is made to flow into grooves in a repair part and surroundings thereof, among grooves in a tread section of the tire.
Figure 21:
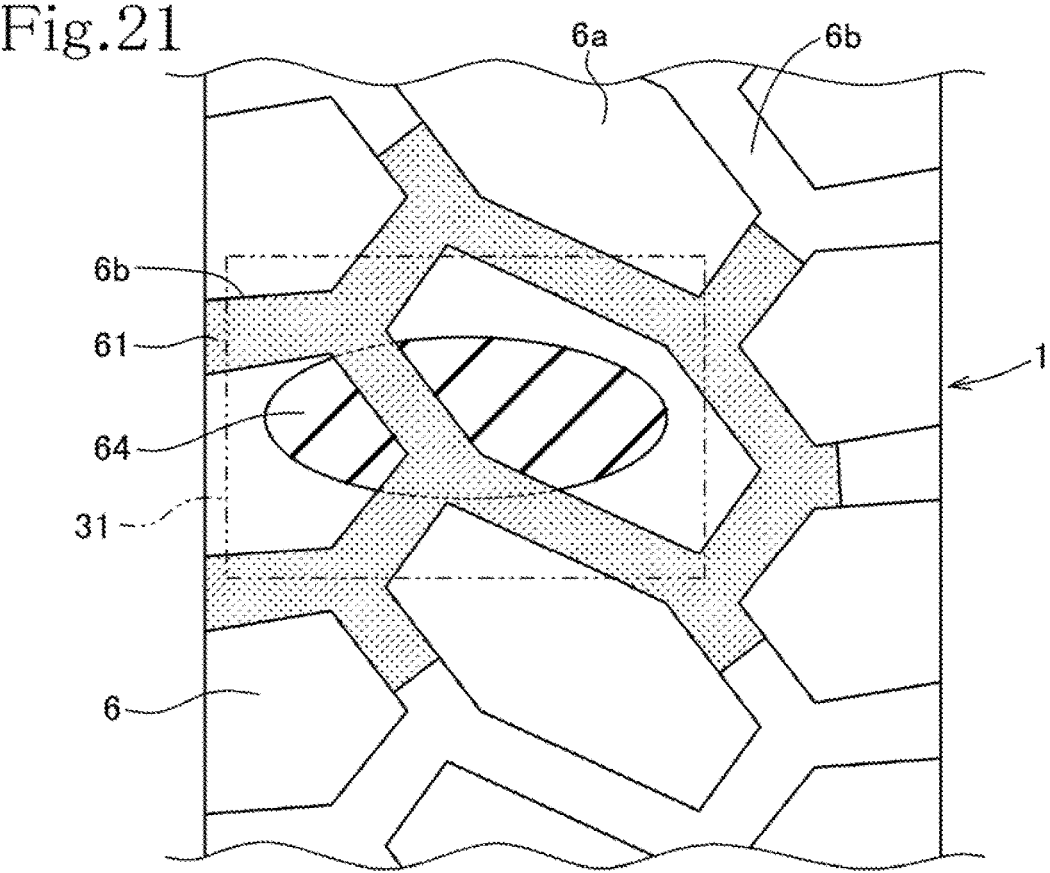
FIG. 21 is an illustration of the repair step in the third embodiment, depicting a state in which a molding material is made to flow into grooves in a repair part and surroundings thereof, among grooves in the tread section.
Figure 22:
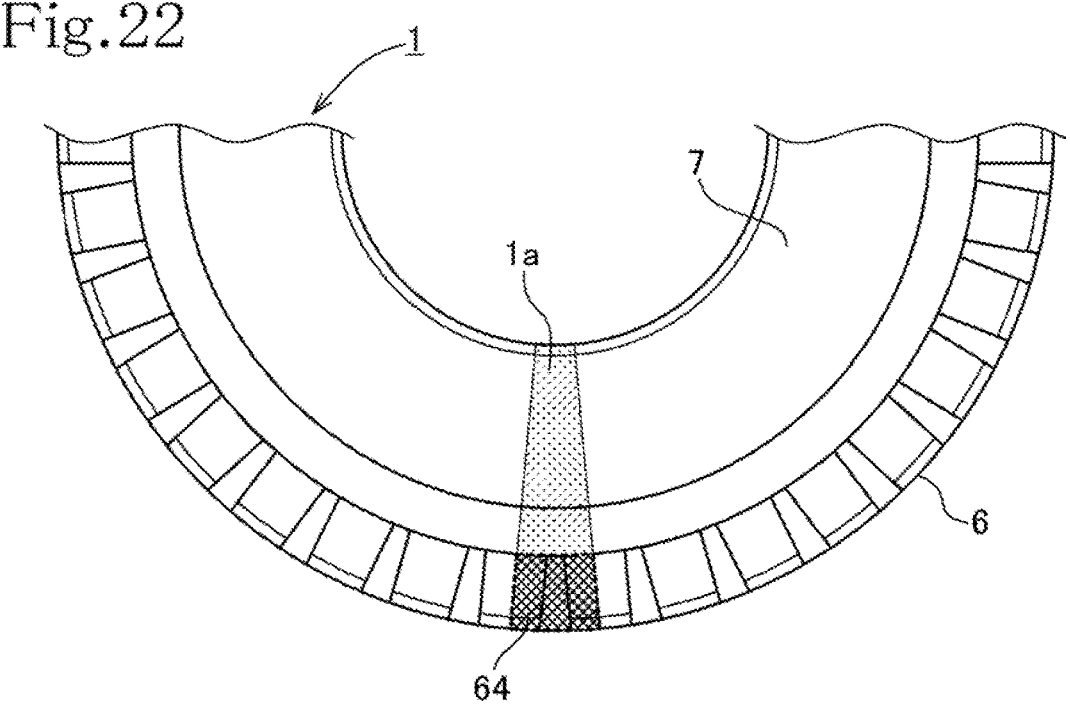
FIG. 22 is a side view of a lower half of a tire, depicting a tire circumferential part which is restricted in a tire circumferential direction and in which a repair part of the tire exists.

The molding material 61 yet to be cured and being fluid thus obtained is made to flow so as to fill the grooves 6*b* in the surroundings of the repair part 64 repaired in shape as depicted in FIGS. 18 and 21, and the surface of the molding material 61 is shaped to be substantially flush with the surface of the lands 6*a*.

While the fluid molding material 61 thus made to flow into the grooves 6*b* is left to stand to effect curing and drying, surplus water contained in the molding material 61 is removed. Since the molding material 61 contains the water-insoluble member, the amount of the gypsum slurry in the molding material 61 made to flow into the grooves 6*b* can be reduced, as compared to the case of a molding material 61 which does not contain the water-insoluble member. Therefore, the time for curing and drying of the molding material 61 can be shortened.

Figure 19:
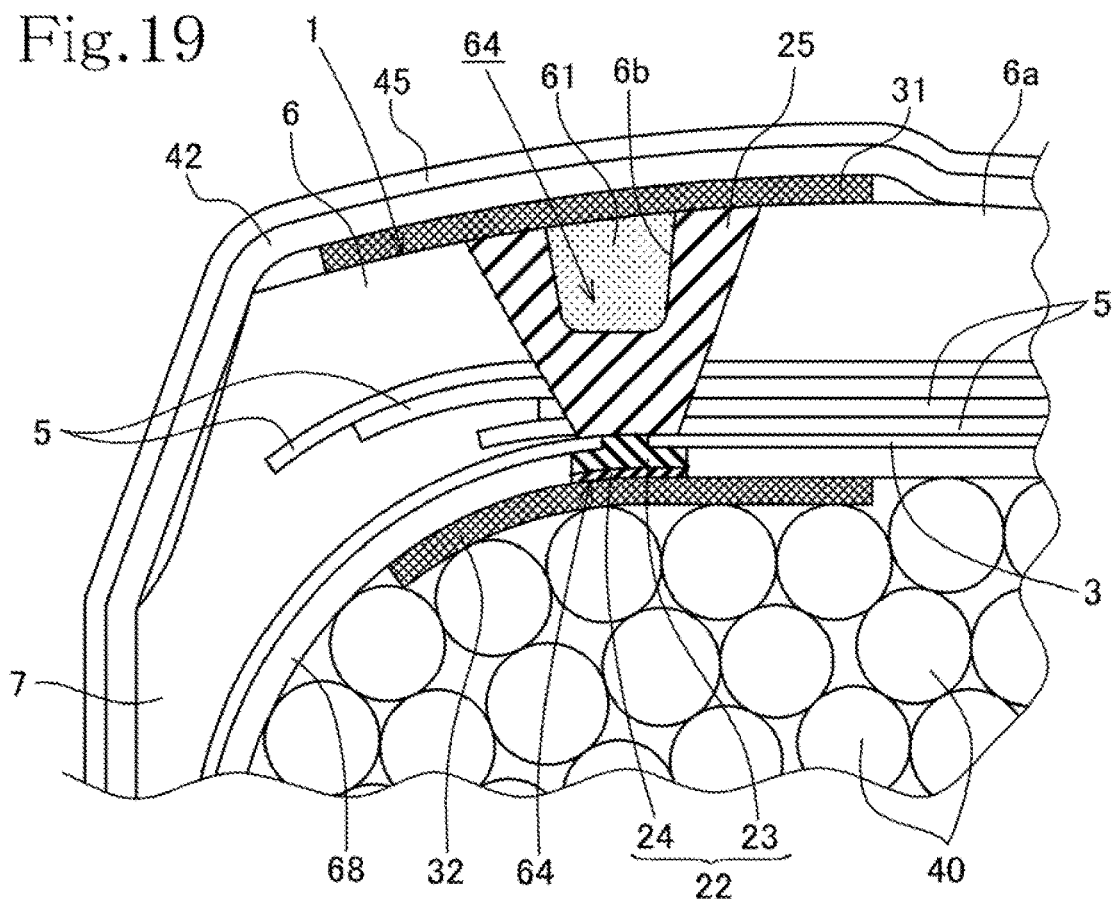
FIG. 19 is an illustration of the repair step in the third embodiment, depicting a state in which electric heating pads are applied on outside and inside of a repair part of a tire and surroundings thereof, a stuffing member is stuffed in the surroundings of a tire repair part in the tire, and is clamped or fastened by a belt.

Next, after the molding material 61 is cured and dried, an outside electric heating pad 31 and an inside electric heating pad 32 as heating pads are disposed at such positions as to cover the surroundings of the repair part 64 of the tire 1, from both the radially outer side and the radially inner side of the tire 1, as illustrated in FIG. 19. As regards the outside of the tire 1, the outside electric heating pad 31 is placed along the outer surfaces of the repair part 64 repaired with the repair rubber material 25 and the lands 6*a* in the surroundings thereof, of the tread section 6, and along the outer surface of the molding material 61 filling the grooves 6*b*. As regards the inside of the tire 1, the inside electric heating pad 32 is placed along inner wall surfaces of the repair part 64, where the inner liner section 68 is repaired with the unvulcanized inside patch member 22, and the surroundings thereof. While the electric heating pads 31 and 32 are applied on both the outside and the inside of the tire 1 in the present embodiment, the electric heating pad may be applied on only one of the inside and the outside, depending on the state and/or position of the repair part 64.

Figure 23:
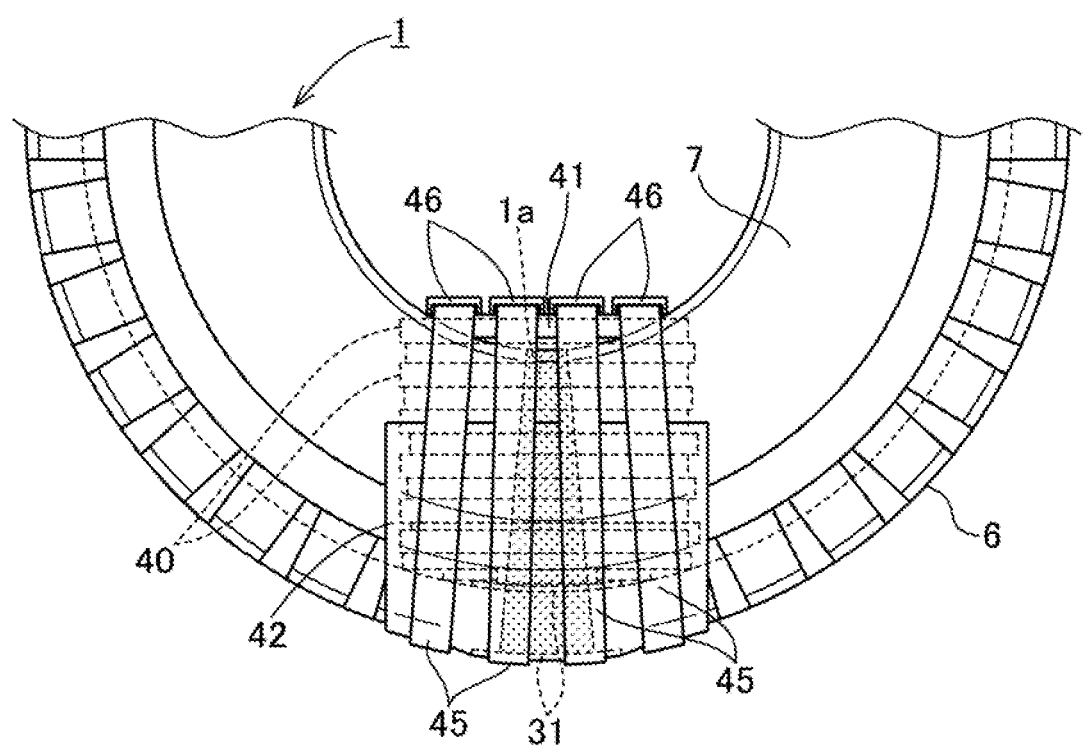
FIG. 23 is a side view depicting a lower half of a tire in the state of FIG. 19.

As depicted in FIGS. 19 and 23, the stuffing members 40 are stuffed inside the repair part 64 of the tire 1 and the surroundings thereof, and is stacked one on the other toward the center of the tire 1 until the stuffing members 40 bulge from the opening between the bead sections 8 of the tire 1. The stuffing members 40 are stuffed at least in the tire inside of the tire circumferential part 1*a* portioned in the circumferential direction of the tire where the repair part 64 exists. The tire circumferential part 1*a* is indicated by a dotted pattern in FIG. 22, and is that part of the tire 1 in which the repair part 64 exists and which is partitioned in the circumferential direction of the tire, as has been mentioned above.

The stuffing members 40 are rod-shaped substantially cylindrical members. While the wood pieces are used as the stuffing members 40 in the present embodiment, the stuffing members 40 may be made of a metal, a heat-resistant plastic or the like. In addition, while the sectional shape of the stuffing members 40 is substantially circular in the present embodiment, the sectional shape of the stuffing members 40 may not be a circle; for example, an ellipse, a semicircle, polygons such as triangles and tetragons, and shapes obtained by combining a polygon or polygons with a circular arc or arcs may be used. In the case where the electric heating pad 32 is placed on the inside of the repair part 64 and the surroundings thereof, the stuffing members 40 are stuffed to press the electric heating pad 32 thereby. The stuffing members 40 thus stuffed and projecting from the opening between the bead sections 8 are covered from above by a plate-shaped presser member 41 (FIG. 23). On the other hand, the electric heating pad 31 arranged on the outside of the tire 1 is covered, up to a peripheral region thereof, by a cover sheet 42.

Thereafter, long belts 45 as fastening members are wound around that part of the tire 1 which includes at least the tire circumferential part 1*a* and in which the stuffing members 40 are stuffed, from the outside of the presser member 41 and the cover sheet 42. The long belts 45 are fastened so as to apply a predetermined pressing force to the repair part 64. Then, through a buckle 46 fixed to one end of each of the belts 45, the other end of the belt 45 is passed, and is fixed. While the four belts 45 are used as the fastening members in the present embodiment, the number of the belts and the width of the belts may be appropriately changed depending on the size and/or position of the repair part 64. In addition, not the belts but a wide strap may be used as the fastening member.

After the repair part 64 of the tire 1 is pressed to a predetermined pressure, an electric current is passed in the electric heating pads 31 and 32 to generate heat. The temperature of the electric heating pads 31 and 32 is controlled to a temperature suitable for vulcanizing the unvulcanized rubber used for repair of the tire 1, the repair part 64 is pressed and heated for a predetermined time to be vulcanized thereby, and thus the repair part 64 is joined to its surrounding part.

After the repair part 64 is pressed and vulcanized for a predetermined time, the fastening members 45 and the presser member 41 are detached from the tire 1, the stuffing members 40 are taken out from the inside of the tire 1, and the cover sheet 42 and the electric heating pads 31 and 32 are detached from the repair part 64. Thereafter, the molding material 61 embedded in the grooves 6*b* in the surroundings of the repair part 64 is crushed and removed from the tread section 6, whereby the repair operation for the tire 1 is finished.

As above described, in the tire repair method according to the third embodiment of the present invention, the shape of the damaged part of the tire 1 damaged in the tread section 6 is repaired by the tread rubber 25 and the patch member 22 as the repair materials made of at least unvulcanized rubber. The powdery calcined gypsum as a base material is mixed with at least water and the water-insoluble member to prepare the molding material 61 in a fluid state. The grooves 6*b* of the tread section 6 in the periphery of the repair part 64 are filled with the molding material 61 in the fluid state. After the molding material 61 is cured and dried, the electric heating pads 31 and 32 are applied around the repair part 64, the surroundings of the repair part 64 are pressed, and the repair part 64 is heated by the electric heating pads 31 and 32 to vulcanize the unvulcanized rubber. Therefore, at the time of vulcanization, even without preparing molds on the basis of the kind of the tire and the shape of the tread, the unvulcanized tread rubber 25 in the repair part 64 can be maintained in a predetermined shape, and it is possible to realize an enhanced operation effectiveness and a reduction in cost.

Further, since the molding material 61 for filling the grooves 6*b* of the tread section 6 is a material obtained by mixing calcined gypsum with at least water and the water-insoluble member, the proportion of the gypsum slurry made of calcined gypsum and water and the like other than the water-insoluble member can be lowered by the water-insoluble member. Therefore, the time for curing and drying of the molding material 61 can be shortened, the time required for repairing the tire 1 is shortened, whereby the operability is enhanced, and a reduction in cost can be realized.

In addition, since at least one of rubber, wood, and metal is used as the water-insoluble member, waste rubber discarded in repairing operations and inexpensive wood can be used, so that a reduction in cost can be realized. Further, since a metal is used as the water-insoluble member in the molding material 61 to be used for the repair part 64, thermal conductivity from the electric heating pads 31 and 32 to the repair part 64 through the molding material 61 is enhanced, so that the part to be vulcanized can be vulcanized effectively.

Furthermore, the electric heating pads 31 and 32 are applied and the stuffing member 40s are stuffed in the tire circumferential part 1a occupying a restricted area in the tire circumferential direction where the repair part 64 exists, and the tire part stuffed with the stuffing members 40 is fastened and pressed from the surroundings by the fastening members 45. The repair part 64 is heated by the electric heating pad 31 disposed on the outside of the repair part 64 of the tire 1, and the electric heating pad 32 disposed on the inside of the repair part 64. Therefore, the repair part 64 can be heated from both the outside and the inside of the tire 1, and the unvulcanized rubber at the repair part 64 can be vulcanized sufficiently.

In the present embodiment, the tire 1, in which the repair part 64 reaches both the carcass ply 3 and the belt layers 5, is repaired. In the tire repair method of the present invention, a tire damaged to such a degree that the damaged part does not reach the carcass ply 3 or the belt layers 5 may also be repaired. In addition, where the damaged part is shallow, a tire may be repaired, without using the patch member 22, by filling the damaged part with unvulcanized tread rubber 25 and repairing the shape.

Figure 24:
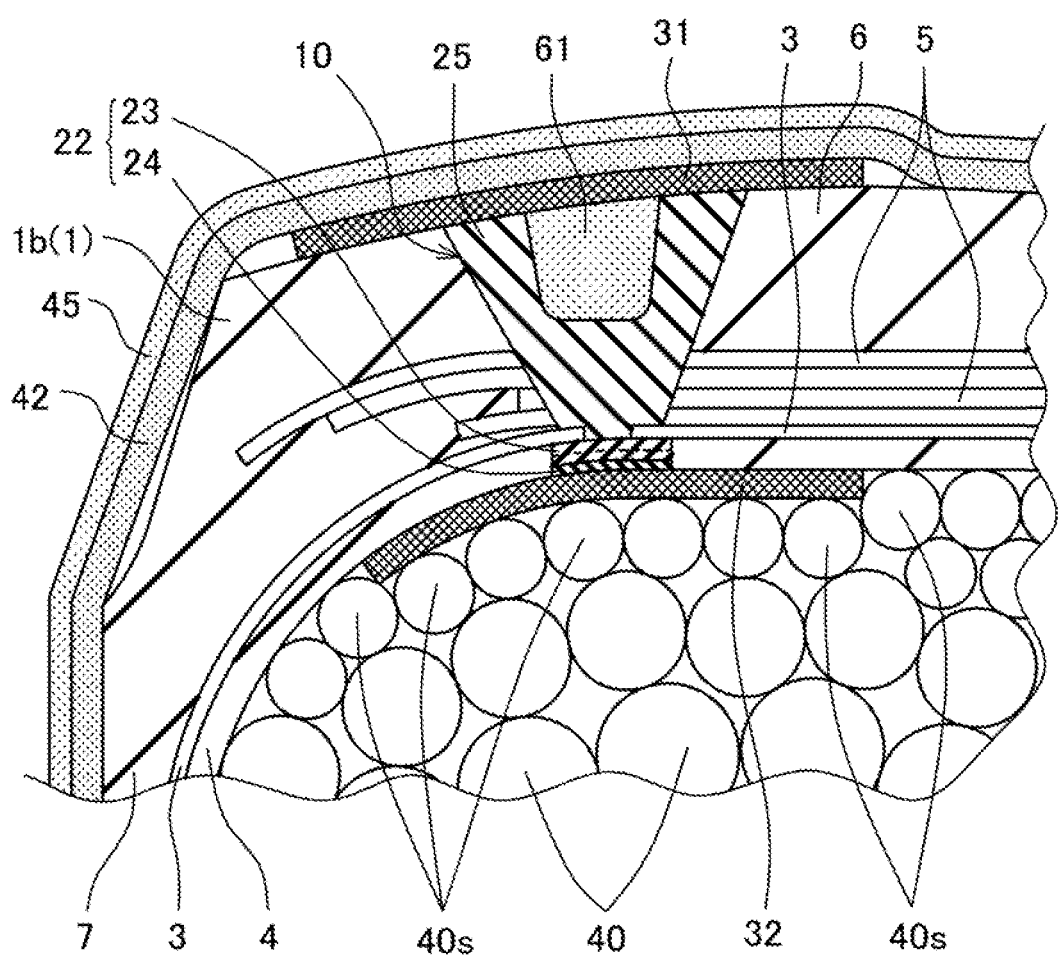
FIG. 24 is a figure similar to FIG. 19, depicting a modification of the third embodiment.

FIG. 24 is a figure corresponding to FIG. 19 related to the tire repair method of the third embodiment, and depicts a modification of the third embodiment. In the embodiment illustrated in FIG. 19, the stuffing members 40 stuffed inside of the repair part 64 and the surroundings thereof of the tire 1 have the same shape and size. On the other hand, in the modification depicted in FIG. 24, wood pieces 40 as stuffing members stuffed on the inside of the inside electric heating pad 32 includes pad-adjoining wood pieces 40s stuffed along the periphery of the inside electric heating pad 32 and other wood pieces 40, and the pad-adjoining wood pieces 40s are smaller than the other wood pieces 40 in sectional area in the section along a tire width direction. Therefore, a multiplicity of the pad-adjoining wood pieces 40s small in sectional area can be finely arranged on a irregularly shaped surface along the periphery of the inside electric heating pad 32 covering the inside patch member 22 which is a repair material for the inner peripheral surface of the tire.

In the third embodiment of the invention and its modification, also, iron rods may be used as the outer peripheral stuffing members for exerting a pressing force on the tire part in the periphery of the inside patch member 22 through the inside electric heating pad 32 and pressurizing the tire part in the periphery of the inside patch member 22.

In this case, the tire parts filled with the repair materials (the inside patch member 22, the repair rubber section 25) are pressed by the iron rods having a high thermal conductivity through the inside electric heating pad 32, whereby heat radiation is accelerated, vulcanization of the vulcanized rubber in the surroundings of the repair materials is restrained, and over-vulcanization of the rubber being vulcanized is restrained.

In the above embodiments, a tire in which the damaged part reaches the carcass ply is repaired. In the tire repair method of the present invention, however, even in the case of a tire in a damaged state in which the damaged part does not reach the carcass ply or the belt layers, the tire can be similarly repaired, by filling a repair recess or recesses with repair rubber.

In the above embodiments, an air bag having a low thermal conductivity may be provided on the outside of the electric heating pad applied to the surfaces of the repair rubber section such as the patch member and the surroundings thereof. In this case, pressurization by the air bag is further added to the unvulcanized rubber in the repair part, and, due also to a heat insulation effect of the air bag, vulcanization of the unvulcanized rubber in the repair part can be accelerated.

A heat insulating material such as a rubber sheet like a conveyor belt for protection may be provided on the outside of the air bag.

Figure 25:
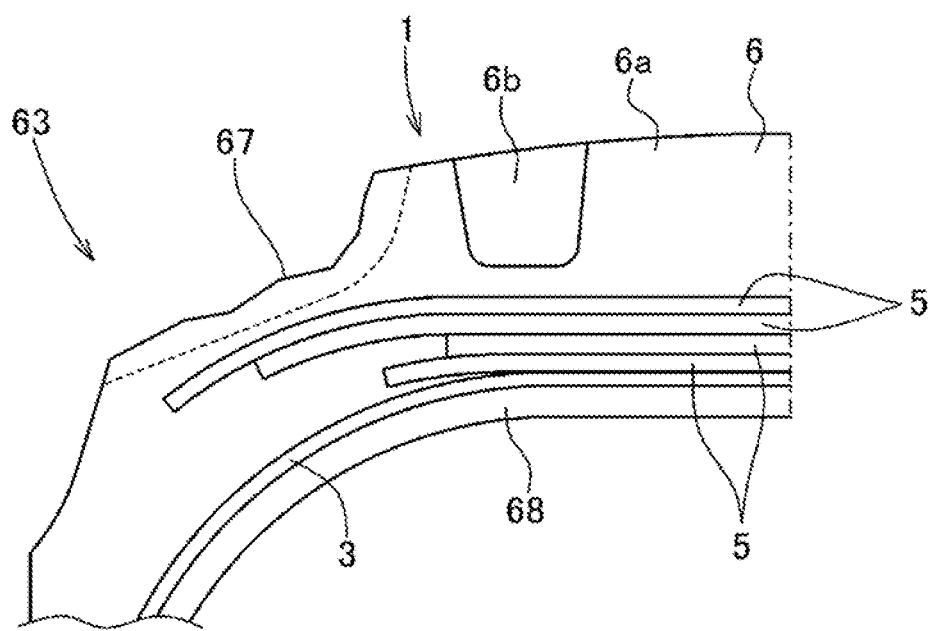
FIG. 25 is an illustration of a repair step in a fourth embodiment of the present invention, depicting a damaged state of a tire.

A tire repair method of a fourth embodiment will be described below, referring to FIGS. 25 to 30. In the tire repair method in the present embodiment, as depicted in FIG. 25, a tire 1 is repaired, in which part of lands 6a of a tread section 6 and part of a shoulder section 63 are lost, by damage to the vicinity of a tire widthwise end portion of the tread section 6. The tire 1 used in the present embodiment has a damaged part different from the damaged part of the tire 1 in the third embodiment, but the tire in the present embodiment is the same in the other parts as the tire 1 in the third embodiment. Therefore, the same parts will be referred to using the same reference signs.

Figure 26:
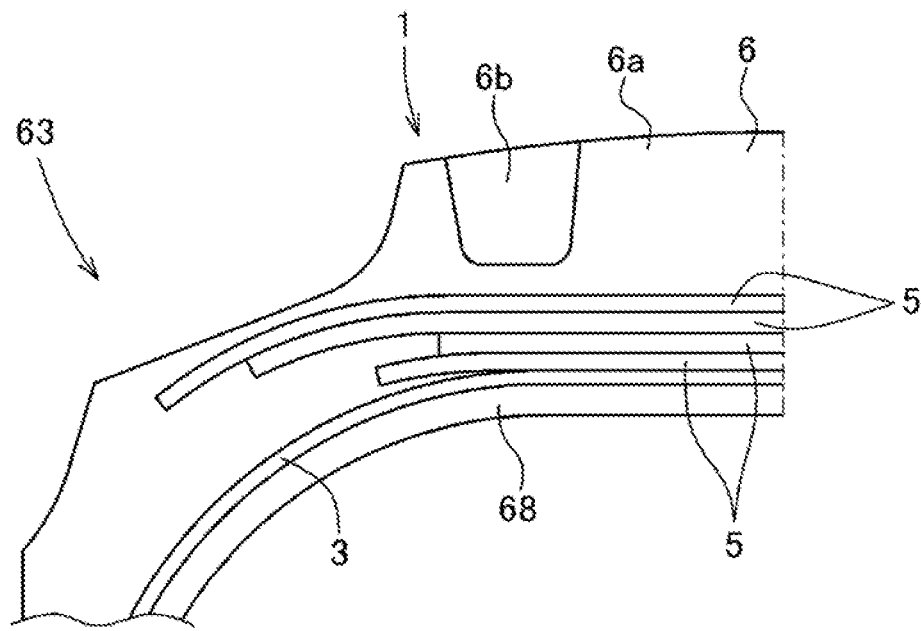
FIG. 26 is an illustration of the repair step in the fourth embodiment, depicting a state in which the damaged part is clearly removed.

A damaged part 67 (FIG. 25) of the tread section 6 and the shoulder section 63 of the tire 1 is examined by an inspector, and, as illustrated in FIG. 26, the tread rubber in the damaged part 67 and the surroundings thereof is removed in a radial shape (arcuate shape) by use of a re-groover or the like, with the damaged part 67 as a center. In this instance, the tread rubber is removed while taking care that the damaged part 67 of the tread section 6 does not remain.

Figure 27:
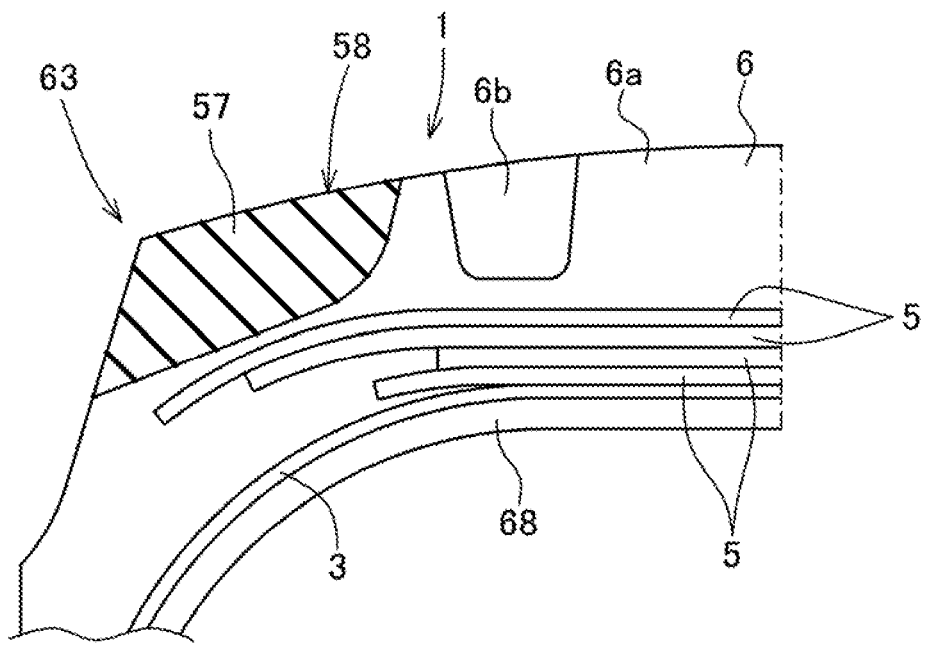
FIG. 27 is an illustration of the repair step in the fourth embodiment, depicting a state in which the part where the damaged part has been clearly removed is filled or deposited with unvulcanized tread rubber to repair the shape.
Figure 30:
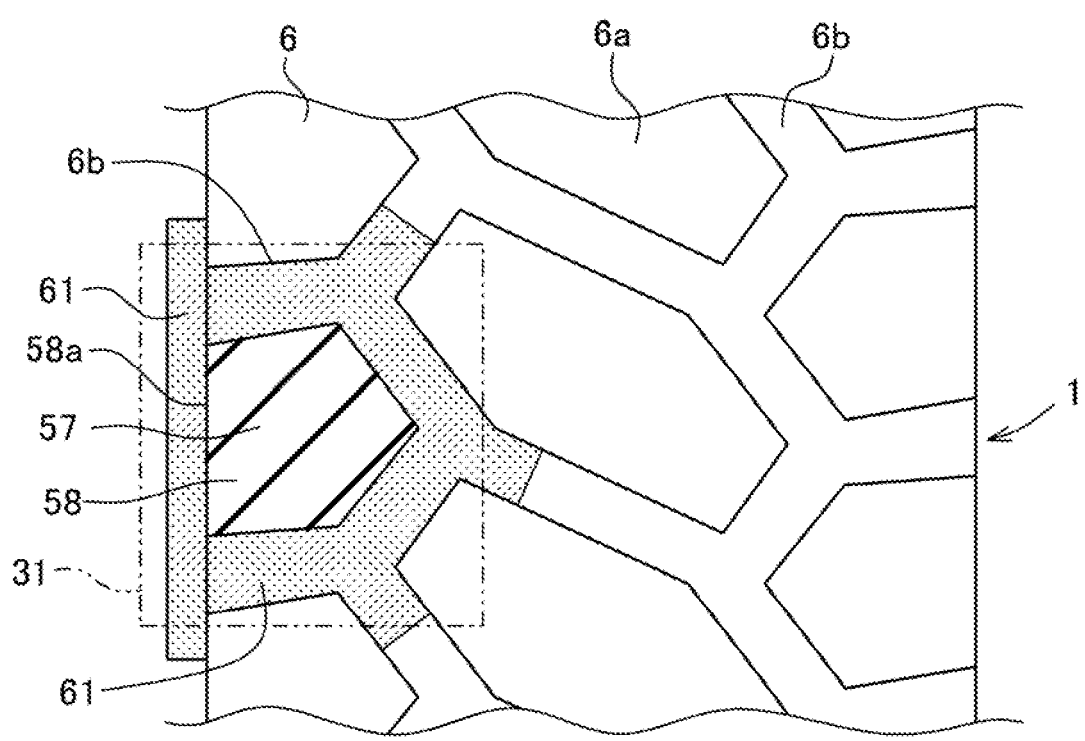
FIG. 30 is an illustration of the repair step in the fourth embodiment, depicting a state in which grooves in the repair part and the surroundings thereof, of grooves in the tread section, are filled with a molding material, and the side surface of a shoulder section repaired is covered with the molding material.

As illustrated in FIGS. 27 and 30, an unvulcanized tread rubber 57 as a repair material in a heated and fluidized state is built up on the side of the tread section 6 and in the shoulder section 63 of the tire 1, in a state of filling the deficient part. Further, the shapes of the lands 6a and the grooves 6b of the tread section 6 that have been lost are repaired into the shapes prior to the trouble of the tire 1, that is, into the shapes of the tire in a substantially unused state. The unvulcanized tread rubber 57 may be the same as or different from the tread rubber before the repair.

At the time of vulcanizing the repaired part 58 repaired in shape by the unvulcanized tread rubber 57 by pressing and heating as aforementioned, a molding material 61 for maintaining the shape of the unvulcanized rubber is prepared. The molding material 61 is obtained by the same operation as in the third embodiment. The operation of preparing the molding material 61 may be conducted after the above-mentioned repairing operation is finished, or simultaneously with the repairing operation.

Figure 28:
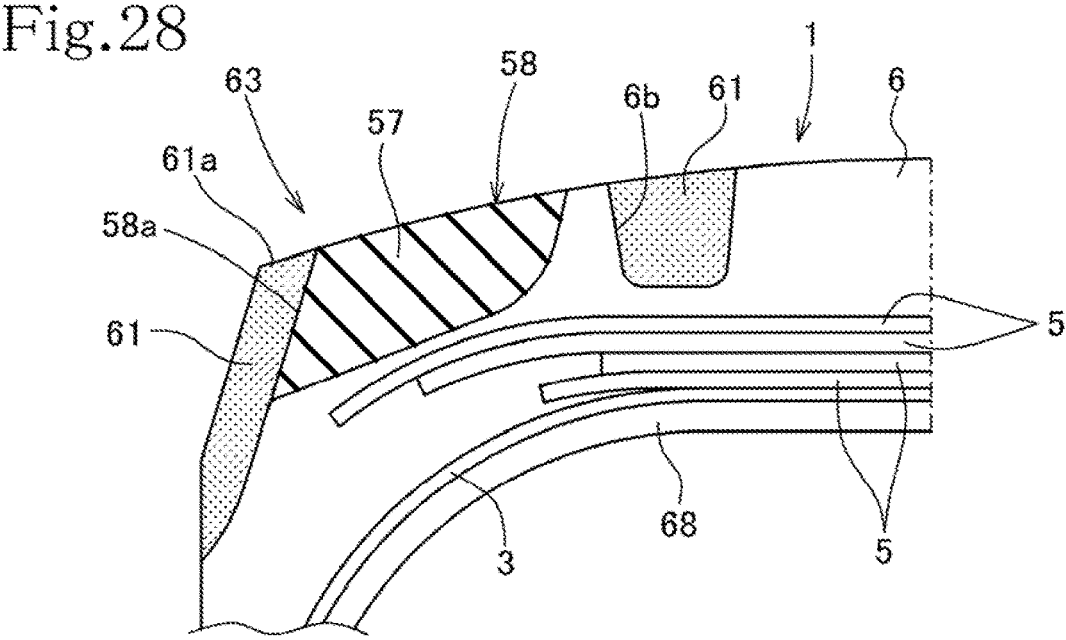
FIG. 28 is an illustration of the repair step in the fourth embodiment, depicting a state in which grooves in a repair part and the surroundings thereof, of grooves in the tread section, are filled with a molding material, and the molding material is built up in a predetermined thickness such as to cover side surfaces of the repair part located at tire widthwise side surfaces.

The molding material 61, in fluidized state, yet to be cured obtained in this way is placed, as depicted in FIGS. 28 and 30, to also fill the grooves 6b in the surroundings of the repaired part 58 repaired in shape. Further, the molding material 61 is build up to have a predetermined thickness from the side of the tire in such a manner as to cover a repaired part side surface 58a located at a tire widthwise side surface of the repaired part 58. A radially outer surface 61a of the molding material 61 covering the repaired part side surface 58a is formed to be continuous with the tread surface of the tread section 6. Of the repaired part 58 repaired in shape, the land 6a located at a tire widthwise end has its shape maintained by a process in which the perimeter of the repaired land 6a in the tread surface is surrounded by the molding material 61 made to flow into the grooves 6b and by the molding material 61 built up on the tire widthwise side surface, as depicted in FIG. 30.

The molding material 61, in fluidized state, filling the grooves 6b and built up on the tire widthwise outer edge in the above way is left as it is, and while curing and drying the molding material 61, surplus water contained in the molding material 61 is removed.

Figure 29:
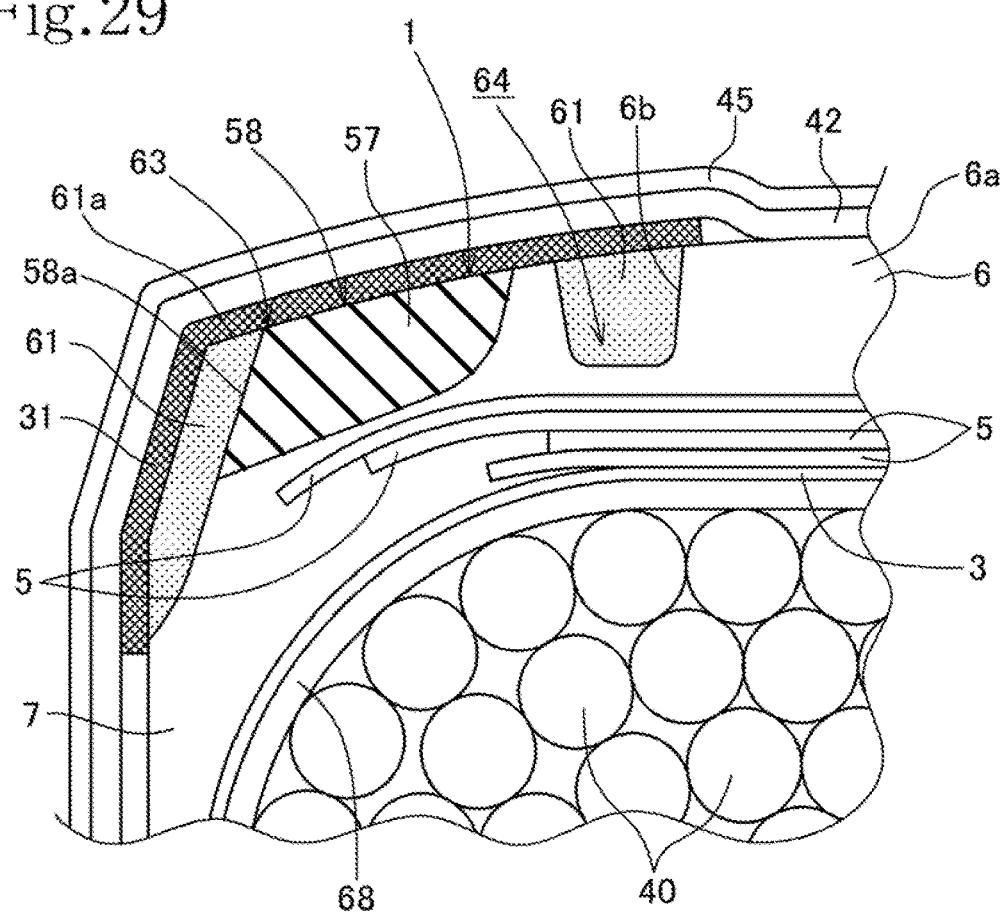
FIG. 29 is an illustration of the repair step in the fourth embodiment, depicting a state in which electric heating pads are attached or applied to a repair part and the surroundings thereof of the tire, a stuffing members are stuffed inside the tire in the surroundings of the repair part of the tire, and is fastened by a belt.

After the molding material 61 is cured and dried, an electric heating pad 31 is applied from the outside of the tire 1 such as to be located on and around the repaired part 58 of the tire 1, as illustrated in FIG. 29. The electric heating pad 31 is applied on the repaired part 58 repaired with the repair material of the tread section 6 and the surrounding tread section 6, on outer surfaces of the shoulder section 63 and the side wall section 7, on the molding material 61 placed to fill the grooves 6b, and on the outer surface of the molding material 61 built up on the tire widthwise outer edge. The electric heating pad 31 is applied on only the radially outer side of the tire in the present embodiment, but electric heating pads may be applied on both the inside and the outside, depending on the state and position of the repaired part 58.

As shown in FIG. 29, the stuffing members 40 are stuffed inside of the repaired part 58 of the tire 1 and the surroundings thereof, and, in the same manner as in the third embodiment, the stuffing members 40 are stacked in the central part of the tire 1 until they bulge from the opening between the bead sections 8 of the tire 1. The stuffing members 40 are rod-shaped substantially cylindrical one, and wood pieces are used in the present embodiment, but the stuffing members 40 may be made of metal, heat-resistant plastic, or the like. In the case where the electric heating pad is applied on the inside of the repaired part 58 and the surroundings thereof, the stuffing members 40 are stuffed such that the electric heating pad can presses the stuffing members 40. The stuffing members 40 stuffed in this way and bulging from the opening between the bead sections 8 are covered from above by a plate-shaped presser member 41, and the electric heating pad 31 applied on the outside of the tire 1 is covered, including its surroundings, by a cover sheet 42.

Thereafter, in the same manner as in the third embodiment (see FIG. 23), long belts 45 as fastening members are wound around the part stuffed with the stuffing members 40 of the tire 1 from the outside of the presser member 41 and the cover sheet 42, the repaired part 58 of the tire 1 is clamped or fastened with a predetermined pressure, and, through a buckle 46 fixed to one end of each of the belts 45, the other end of the belt 45 is passed for fixing. While the four belts 45 are used as the fastening members in the present embodiment, the number of the belts and the width of the belts may be appropriately changed according to the size and position of the repaired part. In addition, not the belts but a wide strap may be used as the fastening member 45.

After the repaired part 58 of the tire 1 is pressed with a predetermined pressure, an electric current is passed to the electric heating pad 31 to generate heat. The temperature of the electric heating pad 31 is controlled to a temperature suitable for vulcanizing the unvulcanized rubber used for repair of the tire, the repaired part 58 is vulcanized by pressurizing and heating for a predetermined time period, and the repaired part 58 is joined to the surrounding part.

After the repaired part 58 is pressed and vulcanized for a predetermined time period in this way, the fastening members 45 and the presser member 41 are detached from the tire 1, the stuffing members 40 are taken out from the inside of the tire 1, and the cover sheet 42 and the electric heating pad 31 are detached from the repaired part 58. Thereafter, the molding material 61 placed to fill the grooves 6b in the surroundings of the repaired part 58 and the molding material 61 covering the repaired part side surface 58a are crushed and detached from the tread section 6, whereby the repair operation for the tire 1 is finished.

In the fourth embodiment, after the shape of the shoulder section 63 is repaired by the tread rubber 57 not yet vulcanized, the repaired part 58 and the grooves 6b in that region are filled with the molding material, the repaired part side surface 58a is covered with the molding material 61 in fluidized state, and the unvulcanized rubber is vulcanized after curing of the molding material 61. Therefore, even in case where the shoulder section 63 positioned at the tire widthwise side surface of the tread section 6 of the tire 1 is damaged and needs repair, repair can be performed without preparing molds and air bags coping with the kind of the tire and/or the shape of the tread section, so that operability can be enhanced and a reduction in cost can be further realized.

In the third and fourth embodiments as described above, air bags having a low thermal conductivity may be provided on the outside of the repair materials such as the patch member 22 and the electric heating pads 31 and 32 disposed on the surfaces of those regions. Pressing by the air bags is further added to the unvulcanized rubber in the repaired part, and, due also to a heat insulation effect of the air bags, the vulcanization of the unvulcanized rubber in the repaired part can be accelerated.

Further, heat insulating materials such as rubber sheets for protection may be provided on the outside of the air bags, to further enhance the heat insulation effect.

A tire repair method according to a fifth embodiment of the invention will be described below, referring to FIG. 31. In the fifth embodiment, outside heat transfer intermediary members 71 are applied on a surface of a side repair rubber section 25 filling an outside repair recess 11 (see FIG. 2) in a damaged part 10 in a tire circumferential part 1a of a construction vehicle tire 1 and a tire outer surface (surface of a side wall section 7) in the surroundings of the side repair rubber section 25. In addition, an inside heat transfer intermediary members 72 are applied on a surface of an inside patch member 22 adhered to an inside repair recess 12 (see FIG. 2) in the damaged part 10 and a tire inner surface (surface of an inner liner section 4) at a peripheral edge of the inside patch member 22.

The outside heat transfer intermediary members 71 include a central heat transfer intermediary member 71c applied on the surface of the side repair rubber section 25, and peripheral heat transfer intermediary members 71s applied on a tire surface (surface of the side wall section 7) adjacent to peripheral edges of the side repair rubber section 25. The central heat transfer intermediary member 71c and the peripheral heat transfer intermediary members 71s are different in thermal conductivity.

Figure 31:
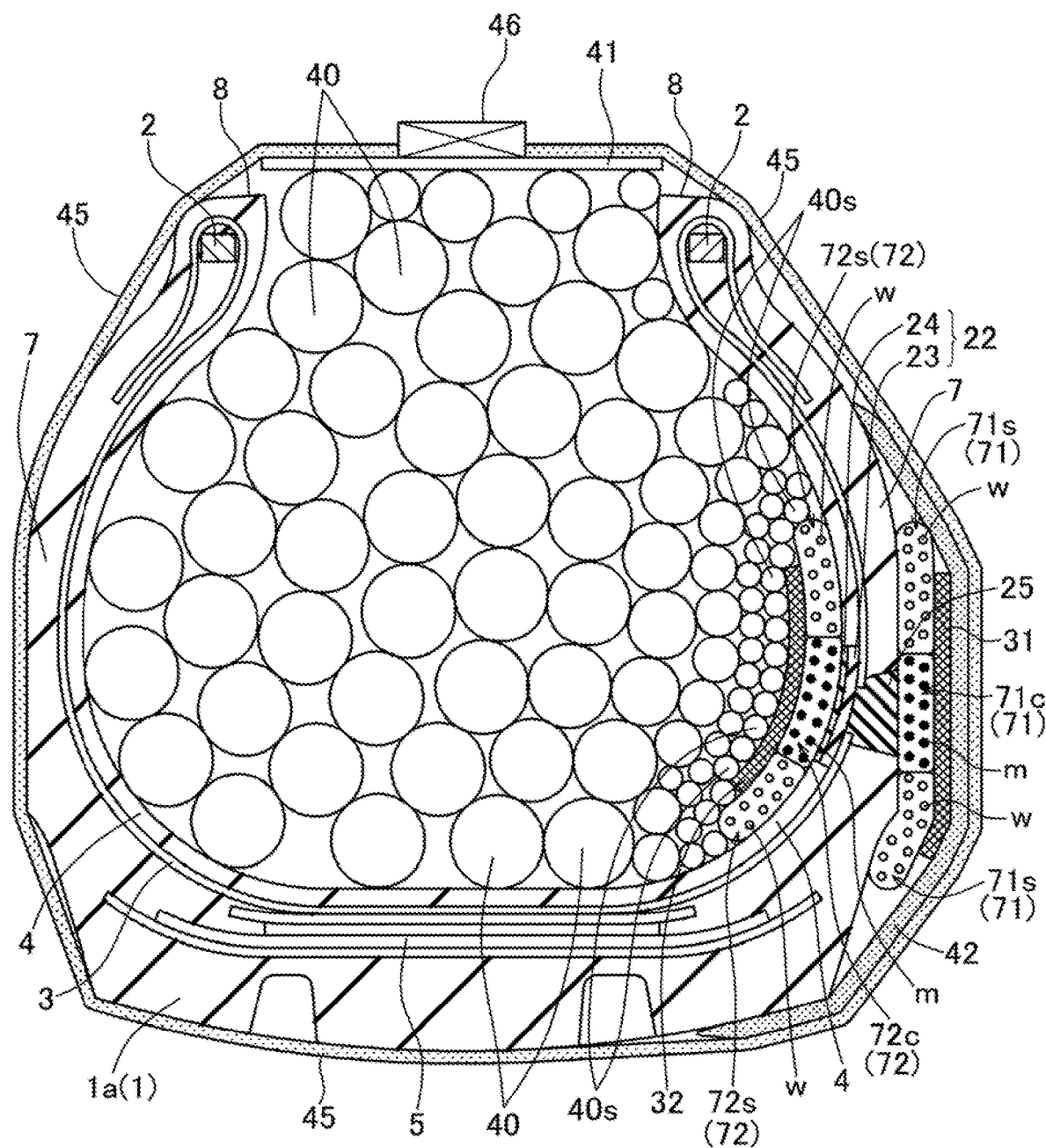
FIG. 31 is a tire widthwise sectional view of a construction vehicle tire damaged in a side wall section, and is a tire widthwise sectional view of the construction vehicle tire in a vulcanizing step in a fifth embodiment of the present invention.

The central heat transfer intermediary member 71c of the outside heat transfer intermediary members 71 is a bag body in which a cloth bag or the like is stuffed with metal chips m (represented by black circles ● in FIG. 31) such as iron chips, whereas the peripheral heat transfer intermediary members 71s of the outside heat transfer intermediary member 71 is a bag body in which a cloth bag or the like are stuffed with waste wood chips w (represented by white circles ○ in FIG. 31).

Therefore, the peripheral heat transfer intermediary members 71s which are the bag bodies stuffed with waste wood chips w is lower in thermal conductivity than the central heat transfer intermediary member 71c which is the bag body stuffed with the metal chips m.

Similarly, the inside heat transfer intermediary members 72 includes a central heat transfer intermediary member 72c applied on the surface of the inside patch member 22, and peripheral heat transfer intermediary members 72s applied on a tire inner surface (surface of an inner liner section 4) adjacent to peripheral edges of the inside patch member 22, and the central heat transfer intermediary member 72c and the peripheral heat transfer intermediary members 72s are different in thermal conductivity.

The central heat transfer intermediary member 72c of the inside heat transfer intermediary members 72 is a bag body in which a cloth bag or the like is stuffed with metal chips m (represented by black circles ● in FIG. 31) such as iron chips, whereas the peripheral heat transfer intermediary members 72s of the inside heat transfer intermediary members 72 are bag bodies in which a cloth bag or the like is stuffed with waste wood chips w (represented by white circles ○ in FIG. 31).

Therefore, the peripheral heat transfer intermediary members 72s which are the bag bodies stuffed with the waste wood chips w is lower in thermal conductivity than the central heat transfer intermediary member 72c which is the bag body stuffed with the metal chips m.

As illustrated in FIG. 31, an outside electric heating pad 31 is applied on the surface of the outside heat transfer intermediary members 71 disposed on a tire outer surface in the damaged part of the construction vehicle tire 1, and an inside electric heating pad 32 is applied on a surface of the inside heat transfer intermediary members 72 disposed on a tire inner surface of the damaged part.

Then, wood pieces 40 as stuffing members are stuffed in the tire inside of the tire circumferential part 1a where the repair materials (the inside patch member 22, the side repair rubber section 25) are applied and the surrounding part of the construction vehicle tire 1. The wood pieces 40 are stuffed inside of the inside electric heating pad 32.

As the wood pieces 40, substantially cylindrical rod-shaped ones are used. A multiplicity of wood pieces 40 differing in outside diameter are stuffed in the tire inside in the tire circumferential part 1a and the surrounding part of the construction vehicle tire 1.

The rod-shaped wood pieces 40 are stuffed inside of the inside electric heating pad 32 in the construction vehicle tire 1 in such a posture that directions perpendicular to a section in the tire width direction (a section as cut along a plane containing a tire rotational center axis) are their longitudinal directions.

FIG. 31 is a tire widthwise sectional view of the construction vehicle tire 1, and depicts a cross section of the wood pieces 40 stuffed in the tire.

As depicted in FIG. 31, of the wood pieces 40 stuffed, pad-adjoining wood pieces 40s stuffed in the periphery of the inside electric heating pad 32 are smaller than the other wood pieces 40 in sectional area in a tire widthwise section.

Therefore, a multiplicity of the pad-adjoining wood pieces 40s small in sectional area can be finely arranged on the irregularly shaped surface in the surroundings of the inside electric heating pad 32 applied on the surface of the inside heat transfer intermediary member 72 covering the inside patch member 22, which is the repair material for the inner peripheral surface of the tire.

Note that the sectional shape of the stuffing members such as wood pieces may not be substantially circular; for example, an ellipse, a semicircle, polygons such as triangles and tetragons, and shapes obtained by combining a polygon or polygons with a circular arc or arcs may also be used.

As illustrated in FIG. 31, the wood pieces 40 are stuffed in the tire inside of the tire circumferential part 1a of the construction vehicle tire 1, in such a manner as to bulge from the opening between the bead sections 8 opposed to each other, and a plate-shaped presser member 41 is placed on the bulging wood pieces 40. A cover sheet 42 covers the outside electric heating pad 31 applied on the surface of the outside heat transfer intermediary members 71 covering the side repair rubber section 25 filling the outside repair recess 11 at the damaged part 10. The cover sheet 42 also covers the surroundings of the outside electric heating pad 31.

Next, the tire circumferential part 1a stuffed with the wood pieces 40 of the construction vehicle tire 1 is fastened by winding, for example, four bands 45 therearound from the outside of the presser member 41 and the cover sheet 42.

The four bands 45 are wound, and both end portions of each of the bands 45 are bound while fastening through the buckle 46 (see FIG. 8).

By the tightening of the four bands 45, those of the wood pieces 40 stuffed in the construction vehicle tire 1 which are located between the bead sections 8 are pressed by the presser member 41, and a pressure is sequentially transmitted to the wood pieces 40 in the tire, resulting in that a pressure for expansion from the inside is exerted on the inner liner section 4 on the tire inner peripheral surface.

The pressure due to the tightening of the four bands 45 is applied to both the tread section 6 and the side wall sections 7 on the tire outer peripheral surface from the outside of the construction vehicle tire 1.

Therefore, the side repair rubber section 25 placed to fill the outside repair recess 11 in the damaged part 10 is pressed through the outside electric heating pad 31 and the outside heat transfer intermediary members 71, while the inside patch member 22 adhered to the inside repair recess 12 in the damaged part 10 is pressed by the wood pieces 40 through the inside electric heating pad 32 and the inside heat transfer intermediary members 72.

While the repair part is clamped or fastened by the four belt-shaped bands 45 in the present embodiment, the number of the bands and the width of the bands may be appropriately changed according to the size and position of the repair part. In some cases, fastening by a single strap having a large width for sufficiently covering the repair part may be adopted.

Next, an electric current is passed in the outside electric heating pad 31 and the inside electric heating pad 32 to generate heat, whereby the side repair rubber section 25 and the inside patch member 22 as the repair materials made of unvulcanized rubber are heated through the outside heat transfer intermediary members 71 and the inside heat transfer intermediary members 72, to be vulcanized, and to be joined to the vulcanized rubber in the surroundings of the repair materials.

In the heating and vulcanizing step, the central heat transfer intermediary member 71c of the outside heat transfer intermediary members 71 applied on the side repair rubber section 25 and the central heat transfer intermediary member 72c of the inside heat transfer intermediary members 72 applied on the inside patch member 22 have high thermal conductivity, and ensure efficient heat transfer, thereby accelerating the vulcanization of the unvulcanized rubber of the repair materials, so that vulcanization time can be shortened.

On the other hand, the peripheral heat transfer intermediary members $71s$ of the outside heat transfer intermediary members 71 which are applied on the tire surface (surface of the side wall section 7) in the surroundings of the side repair rubber section 25 and the peripheral heat transfer intermediary members $72s$ of the inside heat transfer intermediary members 72 which are applied on the tire inner surface (surface of the inner liner section 4) in the surroundings of the inside patch member 22, have low thermal conductivity, so that heat transfer is restrained, and over-vulcanization of the rubber being vulcanized in the surroundings of the repair materials (the side repair rubber section 25, the inside patch member 22) can be restrained.

In the fifth embodiment, the central heat transfer intermediary member $71c$ of the outside heat transfer intermediary members 71 and the central heat transfer intermediary member $72c$ of the inside heat transfer intermediary members 72 are the bag bodies in which cloth bags or the like are stuffed with the metal chips m. However, the material to be stuffed in the bag bodies is not limited to the metal chips m, but may be other small pieces having a comparatively high thermal conductivity, provided that the bag bodies can be freely deformed.

On the other hand, the peripheral heat transfer intermediary member $71s$ of the outside heat transfer intermediary members 71 and the peripheral heat transfer intermediary member $72s$ of the inside heat transfer intermediary members 72 are the bag bodies in which cloth bags or the like are stuffed with the waste wood chips w. However, the material to be stuffed in the bag bodies is not limited to the waste wood chips w, but may be small pieces having a comparatively low thermal conductivity, provided that the bag bodies can be freely deformed.

In addition, the material to be stuffed in the bag body is not limited to one kind of material, but may be two or more kinds of materials in mixture. For example, the peripheral heat transfer intermediary members $71s$ and $72s$ may be bag bodies stuffed with waste wood chips w, whereas the central heat transfer intermediary members $71c$ and $72c$ may be bag bodies stuffed with a mixture of waste wood chips w and metal chips m.

Further, the heat transfer intermediary members may not be bag bodies in which cloth bags or the like are stuffed with small pieces, but may be easily deformable plate members. For example, the central heat transfer intermediary members may be metal plates such as aluminum plates, and the peripheral heat transfer intermediary members may be wood slabs such as veneers.

A tire repair method according to a modification of the fifth embodiment will be described below with reference to FIG. 32.

In this modification of the fifth embodiment, outside heat transfer intermediary members 81 and inside heat transfer intermediary members 82, which are different from the outside heat transfer intermediary members 71 and the inside heat transfer intermediary members 72 in the fifth embodiment, are used, and, in the other points, the modification is the same as the fifth embodiment.

Figure 32:
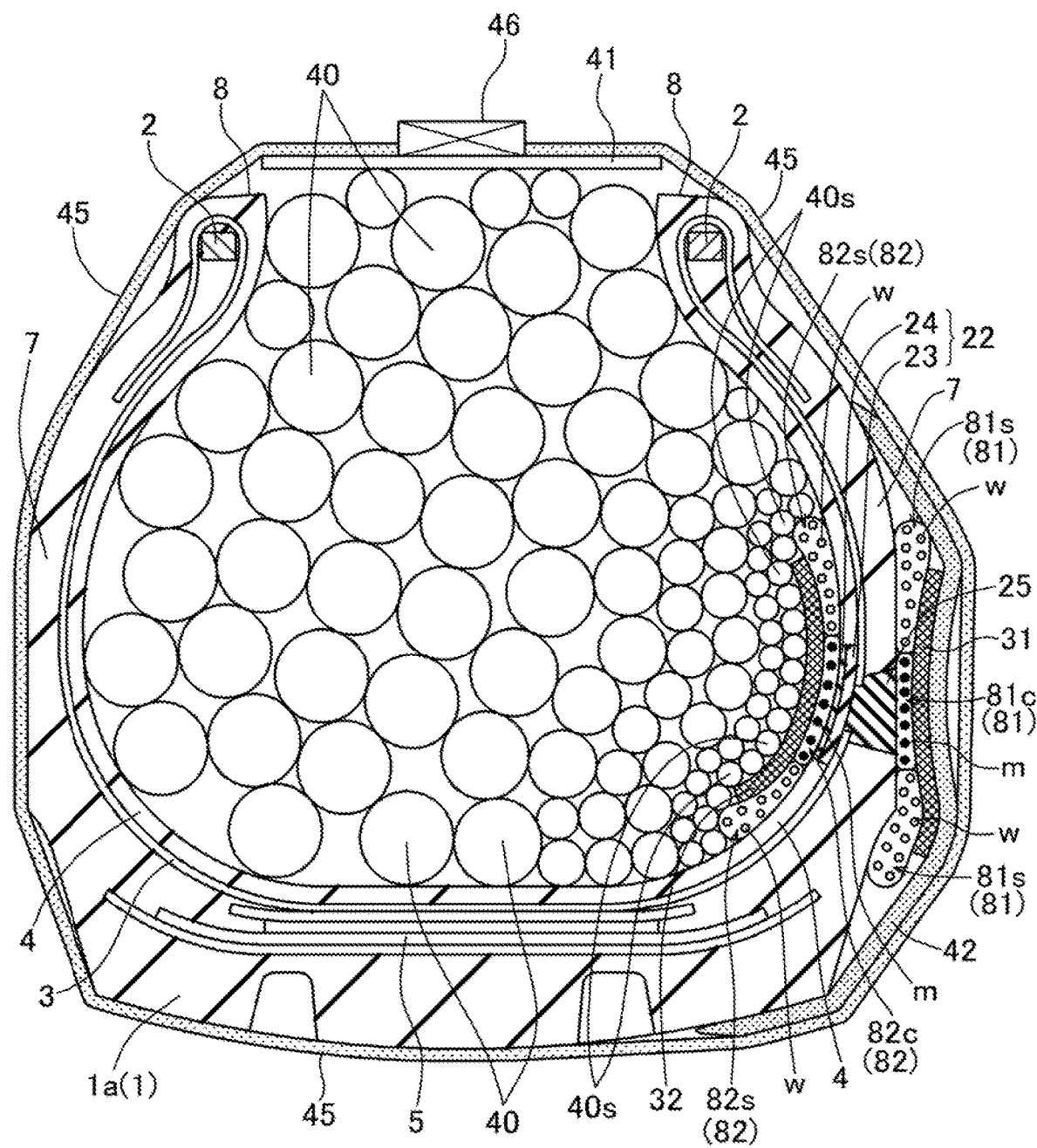
FIG. 32 is a figure similar to FIG. 31, depicting a modification of the fifth embodiment.

Therefore, in FIG. 32, in regard of other members than the outside heat transfer intermediary members 81 and the inside heat transfer intermediary members 82, the same members as above are denoted by the same reference signs as used above.

A central heat transfer intermediary member $81c$, applied on a surface of a side repair rubber section 25, of the outside heat transfer intermediary members 81, in the modification of the fifth embodiment is a bag body in which a cloth bag or the like is stuffed with metal chips m (represented by black circle ● in FIG. 32), while peripheral heat transfer intermediary members $81s$ applied on a tire surface (surface of a side wall section 7) in the surroundings of the side repair rubber section 25 are bag bodies in which cloth bags or the like are stuffed with waste wood chips w (represented by white circles ○ in FIG. 32). As depicted in FIG. 32, the peripheral heat transfer intermediary members $81s$ lower in thermal conductivity than the central heat transfer intermediary member $81c$ are set to be thicker than the central heat transfer intermediary member $81c$, whereby heat transfer therethrough is further restrained.

Similarly, a central heat transfer intermediary member $82c$ applied on an inside patch member 22, of the inside heat transfer intermediary members 82, is a bag body in which a cloth bag or the like is stuffed with metal chips m (represented by black circles ● in FIG. 32), while peripheral heat transfer intermediary members $82s$ applied on a tire inner surface (surface of an inner liner section 4) in the surroundings of the inside patch member 22 are bag bodies in which cloth bags or the like are stuffed with waste wood chips w (represented by white circles ○ in FIG. 32). As illustrated in FIG. 32, the peripheral heat transfer intermediary members $82s$ lower in thermal conductivity than the central heat transfer intermediary member $82c$ are set to be thicker than the central heat transfer intermediary member $82c$, whereby heat transfer therethrough is further restrained.

Therefore, the central heat transfer intermediary member $81c$, disposed on the side repair rubber section 25, of the outside heat transfer intermediary members 81 and the central heat transfer intermediary member $82c$, applied on the inside patch member 22, of the inside heat transfer intermediary members 82 have high thermal conductivity and are smaller in thickness, so that they ensure more effective heat transfer. Accordingly, vulcanization of the unvulcanized rubber of the repair materials (the side repair rubber section 25, the inside patch member 22) is accelerated, so that the vulcanization time can be shortened.

On the other hand, the peripheral heat transfer intermediary members $81s$ of the outside heat transfer intermediary members 81, which are applied on the tire surface (surface of the side wall section 7) in the surroundings of the side repair rubber section 25 and the peripheral heat transfer intermediary members $82s$ of the inside heat transfer intermediary members 82, which are disposed on the tire inner surface (surface of the inner liner section 4) in the surroundings of the inside patch member 22, have low thermal conductivity, and are larger in thickness, so that heat transfer therethrough is further restrained. Accordingly, vulcanization is further restrained, and over-vulcanization of the rubber being vulcanized in the surroundings of the repair materials is securely prevented.

The peripheral heat transfer intermediary members $81s$ and $82s$ of the outside heat transfer intermediary members 81 and the inside heat transfer intermediary members 82 are configured to become thicker as they extend away from the repair material. Therefore, heat transfer therethrough is increased as they extend closer to the repair material, so that the repair material can be firmly joined to the vulcanized rubber in the surroundings thereof.

The heat transfer intermediary members may not be bag bodies in which cloth bags or the like are stuffed with small pieces, but may be easily deformable plate members. For example, the central heat transfer intermediary members may be thin metal plates such as aluminum plates, while the peripheral heat transfer intermediary members may be wood slabs such as veneers which become gradually thicker as they extend away from the repair material.

A tire repair method according to a sixth embodiment will be described below with reference to FIG. 33.

In the sixth embodiment, outside heat transfer intermediary members 91 and inside heat transfer intermediary members 92 are provided. These members 91 and 92 correspond respectively to the peripheral heat transfer intermediary members 81s of the outside heat transfer intermediary members 81 and the peripheral heat transfer intermediary members 82s of the inside heat transfer intermediary members 82 in the modification of the fifth embodiment. On the other hand, heat transfer intermediary members corresponding to the central heat transfer intermediary members 81c and 82c are not provided. The sixth embodiment differs in this respect from the modification of the fifth embodiment. In other respects, the sixth embodiment is the same as the modification of the fifth embodiment.

Figure 33:
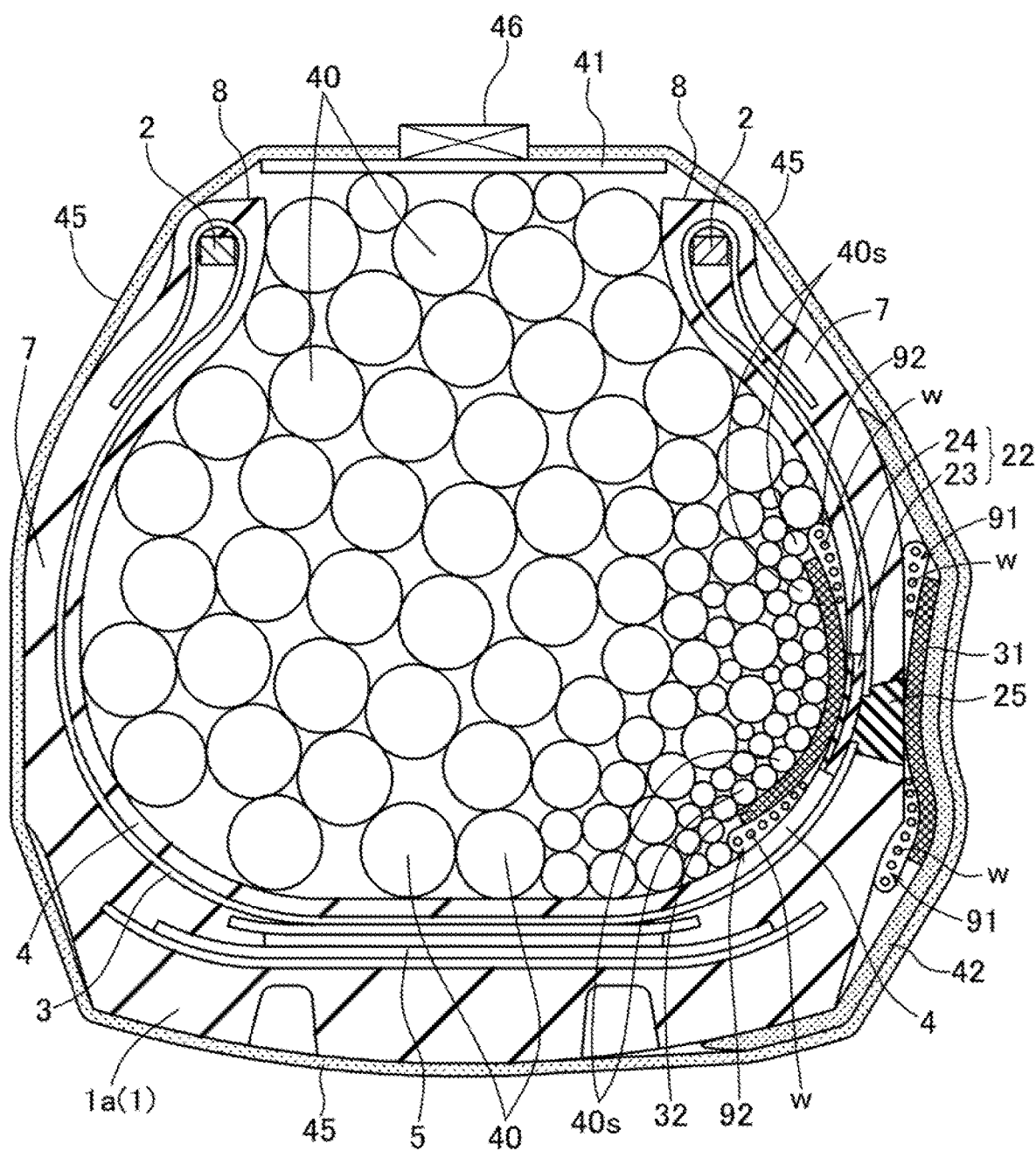
FIG. 33 is a figure similar to FIG. 31, depicting a sixth embodiment.

Therefore, in FIG. 33, as regards other members than the outside heat transfer intermediary members 91 and the inside heat transfer intermediary members 92, the same members as above are denoted by the same reference signs as used above.

Specifically, the outside heat transfer intermediary members 91 in the sixth embodiment are applied on a tire surface (surface of a side wall section 7) in the surroundings of a side repair rubber section 25, while the inside heat transfer intermediary members 92 are applied on a tire inner surface (surface of an inner liner section 4) in the surroundings of an inside patch member 22.

The outside heat transfer intermediary members 91 and the inside heat transfer intermediary members 92 are both bag bodies in which cloth bags or the like are stuffed with waste wood chips w (represented by white circles ○ in FIG. 33), and are configured such as to become gradually thicker as they extend away from the repair material.

The outside heat transfer intermediary members 91 and the inside heat transfer intermediary members 92 may be plate members low in thermal conductivity. For example, wood slabs becoming gradually thicker as they extend away from the repair material may be used.

Therefore, an outside electric heating pad 31 applied on surfaces of the outside heat transfer intermediary members 91 has its central portion in direct contact with the side repair rubber section 25, while an inside electric heating pad 32 applied on surfaces of the inside heat transfer intermediary members 92 has its central portion in direct contact with the inside patch member 22.

Since no heat transfer intermediary member is arranged on the side repair rubber section 25 or the inside patch member 22, direct heat transfer occurs there, and vulcanization of the unvulcanized rubber of the repair materials (the side repair rubber section 25, the inside patch member 22) is accelerated, so that vulcanization time can be shortened.

On the other hand, in the tire parts in the surroundings of the side repair rubber section 25, the outside heat transfer intermediary members 91 low in thermal conductivity are interposed between the tire part and the outside electric heating pad 31, and, therefore, heat transfer there is restrained. Furthermore, in the tire parts (the inner liner section 4) in the surroundings of the inside patch member 22, the inside heat transfer intermediary members 92 low in thermal conductivity are interposed between the tire part and the inside electric heating pad 32, and, therefore, heat transfer there is restrained. Accordingly, over-vulcanization of the rubber being vulcanized in the surroundings of the repair materials (the side repair rubber section 25, the inside patch member 22) can be restrained.

Since the outside heat transfer intermediary members 91 and the inside heat transfer intermediary members 92 are configured to become gradually thicker as they extend away from the repair material, heat transfer therethrough is better in areas closer to the repair material. Therefore, a part closer to the repair material is heated more securely, so that the repair material can be joined firmly to the vulcanized rubber in the surroundings thereof.

While the fifth and sixth embodiments as described above are repair methods in the case where the construction vehicle tire 1 is damaged in the side wall section 7, a repair method in a seventh embodiment is used in the case where the construction vehicle tire 1 is damaged in the tread section and will be described below with reference to FIG. 34.

Note that in the seventh embodiment, the same members as those used in the fifth and sixth embodiments above are denoted by the same reference signs as used above.

The seventh embodiment is a repair method in the case where the tread section 6 of a construction vehicle tire 1 is damaged in the form of a cut and belt layers 5 and a carcass ply 3 inside of the tread section 6 are also damaged.

First, rubber in the surroundings of a damaged part 10 (see FIG. 13) of the tread section 6 is removed by shaving off from the tire outer wall until the carcass ply 3 is exposed, and rubber in the surroundings of the damaged part 10 of an inner liner section 4 (see FIG. 1) is removed from the tire inner wall until the carcass ply 3 is exposed.

Next, an inside patch member 22 is attached from inside to the exposed part of the carcass ply 3, such that the inside patch member 22 covers the lost part of the carcass ply 3 and the surroundings thereof.

The inside patch member 22 is a member obtained by preliminarily integrating, by adhesion, a reinforcement sheet 23 which is a cord rubber coating sheet including a plurality of reinforcement cords coated with rubber and a sheet-shaped inner liner repair rubber member 24.

Since the tire is damaged to the region of the belt layers 5, the cord rubber coating sheet of the reinforcement sheet 23 has a laminated structure in which rubber sheet layers each including therein the reinforcement cords arranged in parallel in a state of being oriented in the same directions are laminated. The laminated rubber sheet layers are configured to reinforce the damaged belt layers 5 in a structure in which the embedded reinforcement cords of the laminated sheets intersect at right angles with each other. However, the reinforcement cords may intersect not at right angles with each other. Note that after the reinforcement sheet 23 is adhered, the inner liner repair rubber member 24 may be adhered thereto.

Next, an original tread pattern is formed by a repair rubber section 25, which is formed first by shaving off rubber from the tire outer wall until the carcass ply 3 is exposed and then by embedding unvulcanized flexible rubber to reproduce the lost part of the tread section 6 into the original shape through a process in which an outer repair groove is formed.

A gypsum slurry prepared by kneading powdery calcined gypsum as a base material with water is used as a molding material 61 for maintaining the shape of the repair rubber section 25, which is repaired with unvulcanized flexible rubber. The molding material 61 is made to flow in a manner to fill the repair rubber section 25 and grooves in the tread pattern in the surroundings thereof, such that the surface of the molding material 61 is substantially flush with the surface of lands.

The fluid molding material 61 thus made to flow into the grooves is left to stand, and, while curing and drying the molding material 61, surplus water contained in the molding material 61 is removed.

Figure 34:
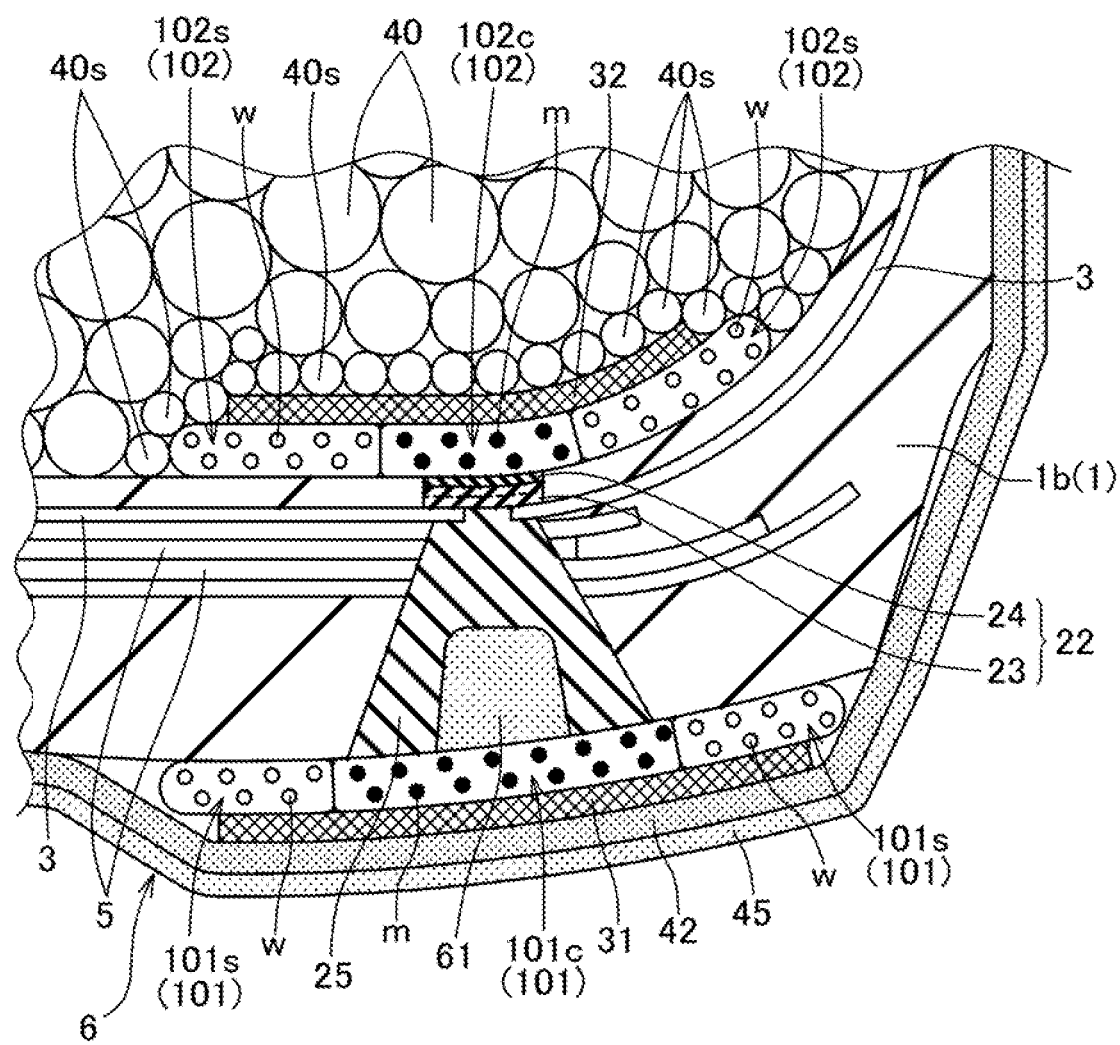
FIG. 34 is a sectional view of a major part of a construction vehicle tire in a vulcanizing step in a seventh embodiment.

After the molding material 61 is cured and dried, as depicted in FIG. 34, outside heat transfer intermediary members 101 are applied on the repair rubber section 25 in the damaged part of the tread section 6 of the construction vehicle tire 1 and the tread surface in the surroundings thereof, while inside heat transfer intermediary members 102 are applied on the surface of the inside patch member 22 and on a tire inner surface (surface of an inner liner section 4) in the surroundings of the inside patch member 22.

The outside heat transfer intermediary members 101 include a central heat transfer intermediary member 101c applied on the repair rubber section 25, and peripheral heat transfer intermediary members 101s applied on the tire surface (surface of the tread section 6) in the surroundings of the repair rubber section 25. The heat transfer intermediary members 101c and 101s are different in thermal conductivity.

The central heat transfer intermediary member 101c of the outside heat transfer intermediary members 101 is a bag body in which a cloth bag or the like is stuffed with metal chips m (represented by black circles ● in FIG. 34) such as iron chips, while the peripheral heat transfer intermediary members 101s of the outside heat transfer intermediary members 101 are bag bodies in which cloth bags or the like are stuffed with waste wood chips w (represented by white circles ○ in FIG. 34).

Therefore, the peripheral heat transfer intermediary members 101s, which are the bag bodies stuffed with the waste wood chips w, are lower in thermal conductivity than the central heat transfer intermediary member 101c which is the bag body stuffed with the metal chips m.

Similarly, the inside heat transfer intermediary members 102 include a central heat transfer intermediary member 102c applied on the surface of the inside patch member 22, and peripheral heat transfer intermediary members 102s applied on the tire inner surface (surface of the inner liner section 4) in the surroundings of the inside patch member 22. The heat transfer intermediary members 102c and 102s are different in thermal conductivity.

The central heat transfer intermediary member 102c of the inside heat transfer intermediary members 102 is a bag body in which a cloth bag or the like is stuffed with metal chips m (represented by black circles ● in FIG. 34) such as iron chips, while the peripheral heat transfer intermediary members 102s of the inside heat transfer intermediary members 102 are bag bodies in which cloth bags or the like are stuffed with waste wood chips w (represented by white circles ○ in FIG. 34).

Therefore, the peripheral heat transfer intermediary members 102s, which are the bag bodies stuffed with the waste wood chips w, are lower in thermal conductivity than the central heat transfer intermediary member 102c which is the bag body stuffed with the metal chips m.

Next, an outside electric heating pad 31 is applied on the surfaces of the outside heat transfer intermediary members 101 applied on the repair rubber section 25 in the damaged part of the tread section 6 and the tread surface in the surroundings thereof, while an inside electric heating pad 32 is applied on the surfaces of the inside heat transfer intermediary members 102 applied on the tire inner surface in the damaged part.

Subsequently, wood pieces 40 as a stuffing material are stuffed on the tire inside on and around a tire circumferential part 1b which is partitioned in the tire circumferential direction and in which the repair materials (the inside patch member 22, the repair rubber section 25) for the tire 1 are provided, similarly to the fifth and sixth embodiments described above.

Of the wood pieces 40 thus stuffed, pad peripheral wood pieces 40s stuffed in the surroundings of the inside electric heating pad 32 are smaller than the other wood pieces 40 in sectional area.

Therefore, a multiplicity of the pad peripheral wood pieces 40s small in sectional area can be finely arranged on the irregularly shaped surface of the inside electric heating pad 32 applied on the inside heat transfer intermediary members 102 covering the inside patch member 22, which is the repair material for the inner peripheral surface of the tire. Consequently, a pressure can be evenly applied to the inside electric heating pad 32.

As in the fifth and sixth embodiments, the wood pieces 40 are stuffed inside the tire circumferential part 1b of the construction vehicle tire 1 in such a manner as to bulge from the opening between the bead sections 8 opposed to each other (though not illustrated), and a plate-shaped presser member 41 is placed on the bulging wood pieces 40, in the same manner as depicted in FIG. 31. In addition, an outside electric heating pad 31 applied on the side repair rubber section 25 placed to fill an outside repair recess 11 in the damaged part 10 is covered by a cover sheet 42 widely together with the surroundings thereof.

Next, the tire circumferential part 1b stuffed with the wood pieces 40 of the construction vehicle tire 1 and the surrounding part are fastened by winding bands 45 therearound from the outside of the presser member 41 and the cover sheet 42.

Then, electric current is passed in the outside electric heating pad 31 and the inside electric heating pad 32 to generate heat, whereby the repair rubber section 25 and the inside patch member 22 which are repair materials made of unvulcanized rubber are heated and vulcanized through the heat transfer intermediary members 101 and 102, and the repair materials are joined to the vulcanized rubber in the surroundings thereof.

In this heating and vulcanizing step, the central heat transfer intermediary member 101c of the outside heat transfer intermediary members 101 applied on the repair rubber section 25 in the damaged part of the tread section 6 and the central heat transfer intermediary member 102c of the inside heat transfer intermediary members 102 applied on the inside patch member 22 are high in thermal conductivity, and ensure good heat transmission, whereby vulcanization of the unvulcanized rubber of the repair material is accelerated, and, therefore, vulcanization time can be shortened.

On the other hand, the peripheral heat transfer intermediary members 101s of the outside heat transfer intermediary members 101 applied on the tire surface (surface of the side wall section 7) in the surroundings of the repair rubber section 25 and the peripheral heat transfer intermediary members 102s of the inside heat transfer intermediary members 102 applied on the tire inner surface (surface of the inner liner section 4) in the surroundings of the inside patch member 22 are low in thermal conductivity, so that heat transfer therethrough is restrained, whereby over-vulcanization of the rubber being vulcanized in the surroundings of the repair materials can be restrained.

After the vulcanization is finished, the bands 45 are detached, the cover sheet 42 and the outside electric heating pad 31 are peeled off, the presser member 41 is removed, the wood pieces 40 inside the tire are removed, and the inside electric heating pad 32 is peeled off. Thereafter, the molding material 61 filling the grooves of the tread pattern and cured is removed, whereby the repair operation for the damaged part of the construction vehicle tire 1 is finished.

Also in the seventh embodiment, the peripheral heat transfer intermediary members 101s and 102s lower in thermal conductivity than the central heat transfer intermediary members 101c and 102c may be made larger in thickness.

With the central heat transfer intermediary members 101c and 102c high in thermal conductivity set to be smaller in thickness, heat is transferred therethrough more effectively, and vulcanization of the unvulcanized rubber of the repair materials (the repair rubber section 25, the inside patch member 22) is further accelerated, so that vulcanization time can be further shortened.

In addition, since the peripheral heat transfer intermediary members 101s and 102s low in thermal conductivity are larger in thickness, heat transfer is further restrained, and over-vulcanization of the rubber being vulcanized in the surroundings of the repair materials is securely prevented.

Besides, also in the seventh embodiment, the heat transfer intermediary members may not be bag bodies in which cloth bags or the like are stuffed with wood pieces, but may be easily deformable plate members. For example, the central heat transfer intermediary members may be metal plates such as aluminum plates, and the peripheral heat transfer intermediary members may be wood slabs such as veneers.

In the above embodiments, tires in which a damaged part reaches the carcass ply are repaired. However, in the tire repair method of the present invention, even in a case of a tire in a damaged state in which the damaged part does not reach the carcass ply or the belt layers, the tire can be similarly repaired, by filling a repair recess or recesses with repair rubber.

While the tire repair methods according to various embodiments of the present invention have been described above, the invention is not limited to the above embodiments, and include those which are carried out in various modes within the scope of the gist of the invention.

For example, the tire repair method of the present invention is applicable not only to large-type construction vehicle tires but also to medium-sized or small-sized tires, provided that they are pneumatic tires.

1 . . . Construction vehicle tire, 1a, 1b . . . Tire circumferential part, 2 . . . Bead ring, 3 . . . Carcass ply, 4 . . . Inner liner section, 5 . . . Belt layer, 6 . . . Tread section, 7 . . . Side wall section, 8 . . . Bead section;
10 . . . Damaged part, 11 . . . Outside repair recess, 12 . . . Inside repair recess;
21 . . . Outside patch member, 22 . . . Inside patch member, 23 . . . Reinforcement sheet, 23a . . . Reinforcement cord, 24 . . . Inner liner repair rubber member, 25 . . . Side repair rubber section;
31 . . . Outside electric heating pad, 32 . . . Inside electric heating pad;
40 . . . Wood piece, 40s . . . Pad-adjoining wood piece, 41 . . . Presser member, 42 . . . Cover sheet, 45 . . . Band, 46 . . . Buckle, 51 . . . Iron rod, 57 . . . Tread rubber, 58 . . . Repaired part;
60 . . . Repair rubber section, 61 . . . Molding material, 64 . . . Repair part, 63 . . . Shoulder section, 67 . . . Damaged part, 68 . . . Inner liner section;
71, 81, 91, 101 . . . Outside heat transfer intermediary member, 71c, 81c, 101c . . . Central heat transfer intermediary member, 71s, 81s, 101s . . . Peripheral heat transfer intermediary member, 72, 82, 92, 102 . . . Inside heat transfer intermediary member, 72c, 82c, 102c . . . Central heat transfer intermediary member, 72s, 82s, 102s . . . Peripheral heat transfer intermediary member

The invention claimed is:

1. A tire repair method comprising:
depositing a repair material made of at least unvulcanized rubber in a damaged part of a damaged tire;
applying a heating pad on a surface of the repair material deposited in the damaged part of the tire;
stuffing a plurality of stuffing members in the tire in a circumferentially restricted part of the tire in which the repair material is deposited;
fastening the circumferentially restricted part of the tire from outside thereof to apply a pressure thereto; and
heating a repair site including the damaged part by heating the heating pad to vulcanize the unvulcanized rubber of the repair material, wherein
the repair material is deposited from a tire inside in a part facing the tire inside of the damaged part, and the heating pad is applied on an inside of the repair material; and
the stuffing members include pad-adjoining stuffing members stuffed in a periphery of the heating pad, the pad-adjoining stuffing members being smaller than other stuffing members in sectional area taken in a tire widthwise direction.

2. The tire repair method according to claim 1, wherein the stuffing members includes central stuffing members cooperating with and pressing the repair material, and peripheral stuffing members cooperating with and pressing a tire part located along a peripheral edge of the repair material; and
the peripheral stuffing members have a thermal conductivity greater than that of the central stuffing members.

3. The tire repair method according to claim 1, wherein the stuffing members are rod-like in shape, and
the stuffing members are stuffed inside the tire in such a posture that longitudinal directions of the rod-like stuffing members are perpendicular to a section of the tire along a tire widthwise direction.

4. The tire repair method according to claim 1, wherein a band is wound around a circumferential part of the tire stuffed with the stuffing members, to apply a pressure to and fasten the tire.

5. The tire repair method according to claim 1,
wherein the damaged part of the tire is a tread section;
a molding material in a fluid state is prepared by mixing at least water and a water-insoluble material with calcined gypsum;
the molding material in the fluid state is filled in a groove of the repaired tread section formed by the repair material deposited in the damaged part including its surroundings;
the heating pad is applied and pressed on a surface of the tread section in the damaged part, after the molding material is cured and dried; and
the damaged part is heated by the heating pad to vulcanize the unvulcanized rubber.

6. The tire repair method according to claim 5,
wherein the damaged part is a tire widthwise end portion of the tread section;
a tire widthwise side surface of the damaged part is covered with the molding material, while groove or grooves in the surroundings of the damaged part are filled with the molding material; and
the damaged part is pressed and heated to vulcanize the unvulcanized rubber, after the molding material is cured and dried.

7. The tire repair method according to claim 5, wherein at least one of rubber, wood, and metal is used as the water-insoluble material.

8. The tire repair method according to claim 5,
wherein after the heating pad is applied on the surface of the tread section in the damaged part,
the stuffing members are stuffed inside the tire in the circumferentially restricted part thereof;
the circumferentially restricted part is fastened and pressed from outside; and
the damaged part is heated by the heating pad to vulcanize the unvulcanized rubber.

9. The tire repair method according to claim 1,
wherein a central heat transfer intermediary member is applied on a surface of the repair material applied on the damaged part of the tire;
peripheral heat transfer intermediary members lower in thermal conductivity than the central heat transfer intermediary member are applied on a tire surface of a peripheral edge of the repair material;
the heating pad is applied on surfaces of the central heat transfer intermediary member and the peripheral heat transfer intermediary members, to press the heating pad on the damaged part to be repaired with the repair material and surroundings thereof; and
the damaged part is heated by the heating pad to vulcanize the unvulcanized rubber of the repair material.

10. The tire repair method according to claim 9, wherein the peripheral heat transfer intermediary members are larger in thickness than the central heat transfer intermediary member.

11. The tire repair method according to claim 1,
wherein the repair material made of at least unvulcanized rubber is deposited in the damaged part of the tire;
a heat transfer intermediary member is applied on a tire surface of a peripheral edge of the repair material deposited in the damaged part of the tire;
the heating pad is applied on a surface of the repair material and a surface of the heat transfer intermediary member;
surroundings of the damaged part to be repaired with the repair material are pressed; and
the repair site is heated by the heating pad to vulcanize the unvulcanized rubber of the repair material.

* * * * *